(12) United States Patent
Lee et al.

(10) Patent No.: US 10,771,820 B2
(45) Date of Patent: Sep. 8, 2020

(54) IMAGE ENCODING METHOD AND APPARATUS USING ARTIFACT REDUCTION FILTER, AND IMAGE DECODING METHOD AND APPARATUS USING ARTIFACT REDUCTION FILTER

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Sun-il Lee, Seoul (KR); Sangyoun Lee, Seoul (KR); Sanghoon Lee, Seoul (KR); Dosik Hwang, Seoul (KR); Changhyun Park, Uijeongbu-si (KR); Sewoong Ahn, Daejeon (KR); Jinseong Jang, Seoul (KR); Chan-yul Kim, Seongnam-si (KR); Taeoh Kim, Seoul (KR); Taejoon Eo, Seoul (KR); Jongyoo Kim, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 96 days.

(21) Appl. No.: 16/105,616

(22) Filed: Aug. 20, 2018

(65) Prior Publication Data
US 2019/0230384 A1   Jul. 25, 2019

(30) Foreign Application Priority Data
Jan. 22, 2018   (KR) .......................... 10-2018-0007887

(51) Int. Cl.
*H04N 19/86* (2014.01)
*H04N 19/172* (2014.01)
(Continued)

(52) U.S. Cl.
CPC ........... *H04N 19/86* (2014.11); *H04N 19/136* (2014.11); *H04N 19/172* (2014.11); *H04N 19/186* (2014.11)

(58) Field of Classification Search
CPC .... H04N 19/117; H04N 19/172; H04N 19/86; H04N 19/136
See application file for complete search history.

(56) References Cited

U.S. PATENT DOCUMENTS 8,982,962 B2    3/2015  Alshin et al.
2014/0044167 A1*  2/2014  Jung ................... H04N 19/176
                                              375/240.12
(Continued)

*Primary Examiner* — John J Lee
(74) *Attorney, Agent, or Firm* — Sughrue Mion, PLLC

(57) ABSTRACT

Provided is an image encoding method including generating a first picture reconstructed by using a residual picture and a predicted picture; generating a second picture by applying a first artifact reduction filter to the first picture; determining a picture having a smaller bit-rate distortion cost from among the first and second pictures by comparing a first bit-rate distortion cost of the first picture with a second bit-rate distortion cost of the second picture; generating a third picture by applying an in-loop filter to the determined picture; generating a fourth picture by applying a second artifact reduction filter to the third picture; determining a picture having smaller distortion from among the third and fourth pictures by comparing first distortion of the third picture with second distortion of the fourth picture; and generating, via a processor, a bitstream including information about whether the second artifact reduction filter is applied.

15 Claims, 24 Drawing Sheets

(51) Int. Cl.
*H04N 19/186* (2014.01)
*H04N 19/136* (2014.01)

(56) References Cited

U.S. PATENT DOCUMENTS

| | | | | |
|---|---|---|---|---|
| 2014/0247890 A1* | 9/2014 | Yamaguchi | .......... | H04N 19/172 375/240.29 |
| 2015/0052246 A1* | 2/2015 | Kordasiewicz | .. | H04N 21/64723 709/224 |

* cited by examiner

FIG. 14
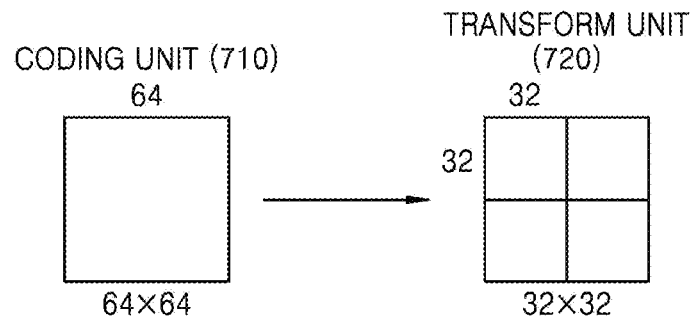
FIG. 15
PARTITION TYPE (800)
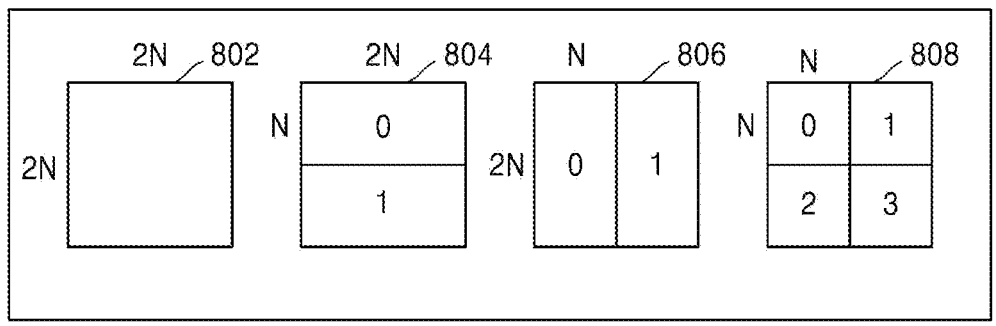
PREDICTION MODE (810)
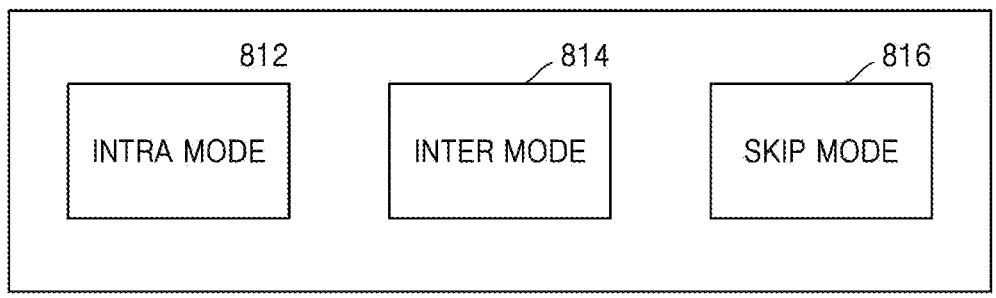
TRANSFORM UNIT SIZE (820)
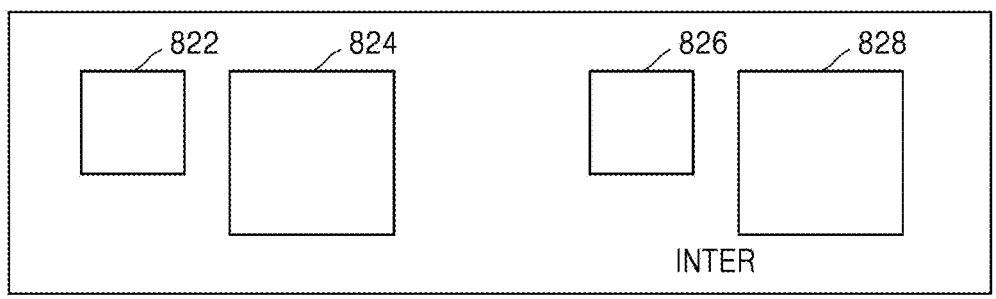

IMAGE ENCODING METHOD AND APPARATUS USING ARTIFACT REDUCTION FILTER, AND IMAGE DECODING METHOD AND APPARATUS USING ARTIFACT REDUCTION FILTER

CROSS-REFERENCE TO RELATED APPLICATION

This application is based on and claims priority under 35 U.S.C. § 119 to Korean Patent Application No. 10-2018-0007887, filed on Jan. 22, 2018, in the Korean Intellectual Property Office, the disclosure of which is incorporated by reference herein in its entirety.

BACKGROUND

1. Field

The disclosure relates to an image encoding method and apparatus for encoding an image by using an artifact reduction filter, and an image decoding method and apparatus for decoding the image by using the artifact reduction filter.

2. Description of Related Art

According to video encoding and decoding methods according to the related art, a video is compressed, regardless of a characteristic of a display, and a bitstream is reconstructed. A video that was reconstructed by using the video encoding and decoding methods according to the related art is loaded to each of displays and then is processed according to different post-processes, and thus, subjective image quality of the video varies according to the displays. In addition, because a large number of bits are allocated to noise to be processed by a post-processor of a display, a compression rate is decreased. Accordingly, there is demand for a new compression method that includes applying a post-processing technique used by a display to the video encoding and decoding methods.

SUMMARY

Provided are an image encoding method and apparatus for encoding an image by using an artifact reduction filter, and an image decoding method and apparatus for decoding the image by using the artifact reduction filter.

Additional aspects will be set forth in part in the description which follows and, in part, will be apparent from the description, or may be learned by practice of the presented embodiments.

In accordance with an aspect of the disclosure, an image encoding method includes generating a first picture reconstructed by using a residual picture and a predicted picture; generating a second picture by applying a first artifact reduction filter to the first picture; determining a picture having a smaller bit-rate distortion cost from among the first and second pictures by comparing a first bit-rate distortion cost of the first picture with a second bit-rate distortion cost of the second picture; generating a third picture by applying an in-loop filter to the determined picture; generating a fourth picture by applying a second artifact reduction filter to the third picture; determining a picture having smaller distortion from among the third and fourth pictures by comparing first distortion of the third picture with second distortion of the fourth picture; and generating, via a processor, a bitstream including information about whether the second artifact reduction filter is applied.

In accordance with another aspect of the disclosure, an image encoding apparatus includes a first artifact reduction filter applier configured to generate a first picture reconstructed by using a residual picture and a predicted picture, and generate a second picture by applying a first artifact reduction filter to the first picture; a bit-rate distortion cost comparator configured to determine a picture having a smaller bit-rate distortion cost from among the first and second pictures by comparing a first bit-rate distortion cost of the first picture with a second bit-rate distortion cost of the second picture; a second artifact reduction filter applier configured to generate a third picture by applying an in-loop filter to the determined picture, and generate a fourth picture by applying a second artifact reduction filter to the third picture; a distortion comparator configured to determine a picture having smaller distortion from among the third and fourth pictures by comparing first distortion of the third picture with second distortion of the fourth picture; and a bitstream generator configured to generate a bitstream including information about whether the second artifact reduction filter is applied.

In accordance with another aspect of the disclosure, an image decoding method includes receiving a bitstream including information about whether to apply an artifact reduction filter after an in-loop filter is applied; reconstructing a picture by performing decoding on the bitstream; when the information indicates that the artifact reduction filter is to be applied after the in-loop filter is applied, applying the second artifact reduction filter to the reconstructed picture to which the in-loop filter has been applied; and when the information indicates that the artifact reduction filter is not to be applied after the in-loop filter is applied, outputting the reconstructed picture to which the in-loop filter has been applied.

In accordance with another aspect of the disclosure, an image decoding apparatus includes a receiver configured to receive a bitstream including information about whether to apply an artifact reduction filter after an in-loop filter is applied; a decoder configured to reconstruct a picture by performing decoding on the bitstream; and an output unit configured to, when the information indicates that the artifact reduction filter is to be applied after the in-loop filter is applied, apply the second artifact reduction filter to a reconstructed picture to which the in-loop filter has been applied, and when the information indicates that the second artifact reduction filter is not to be applied after the in-loop filter is applied, output the reconstructed picture to which the in-loop filter has been applied.

In accordance with another aspect of the disclosure, a non-transitory computer-readable recording medium includes a recorded program for executing the image encoding method and the image decoding method.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 14 is a diagram for describing a relationship between a coding unit and transform units, according to various embodiments;

FIG. 15 illustrates a plurality of pieces of encoding information according to an embodiment;

DETAILED DESCRIPTION

Hereinafter, with reference to FIGS. 1 through 27, various example embodiments of an image encoding method and apparatus and an image decoding method and apparatus will now be described. In more detail, various example embodiments of image encoding and decoding will now be described with reference to FIGS. 1 through 7, and various embodiments of video encoding and decoding based on hierarchical data units according to areas will now be described with reference to FIGS. 8 through 20. Also, with reference to FIGS. 21 through 27, various example embodiments for which a video encoding apparatus and a video decoding apparatus are used will be described.

Throughout the specification, an image may refer to either a still image or a moving picture (i.e., video). In addition, throughout the specification, a picture may be referred to as an image frame.

As used herein, the term "and/or" includes any and all combinations of one or more of the associated listed items. Expressions such as "at least one of," when preceding a list of elements, use the entire list of elements and do not use the individual elements of the list.

Hereinafter, with reference to FIGS. 1 through 7, embodiments of image encoding performed by using an artifact reduction filter, and embodiments of image decoding performed by using the artifact reduction filter will now be described.

Figure 1:
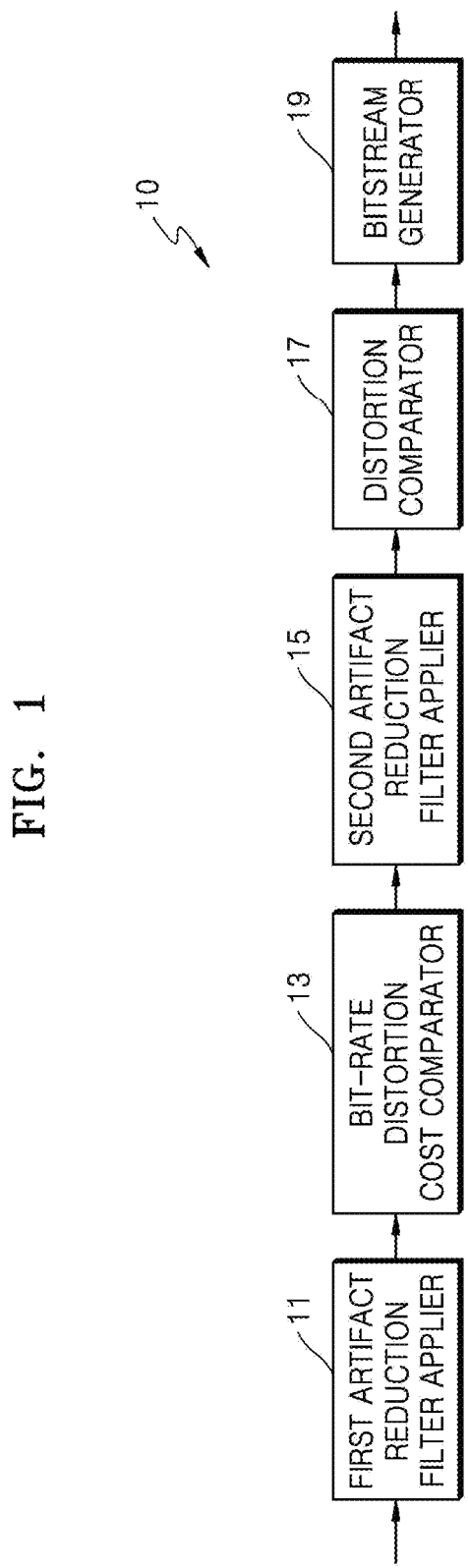
FIGS. 1 and 2 are block diagrams of an image encoding apparatus, according to some embodiments.
Figure 2:
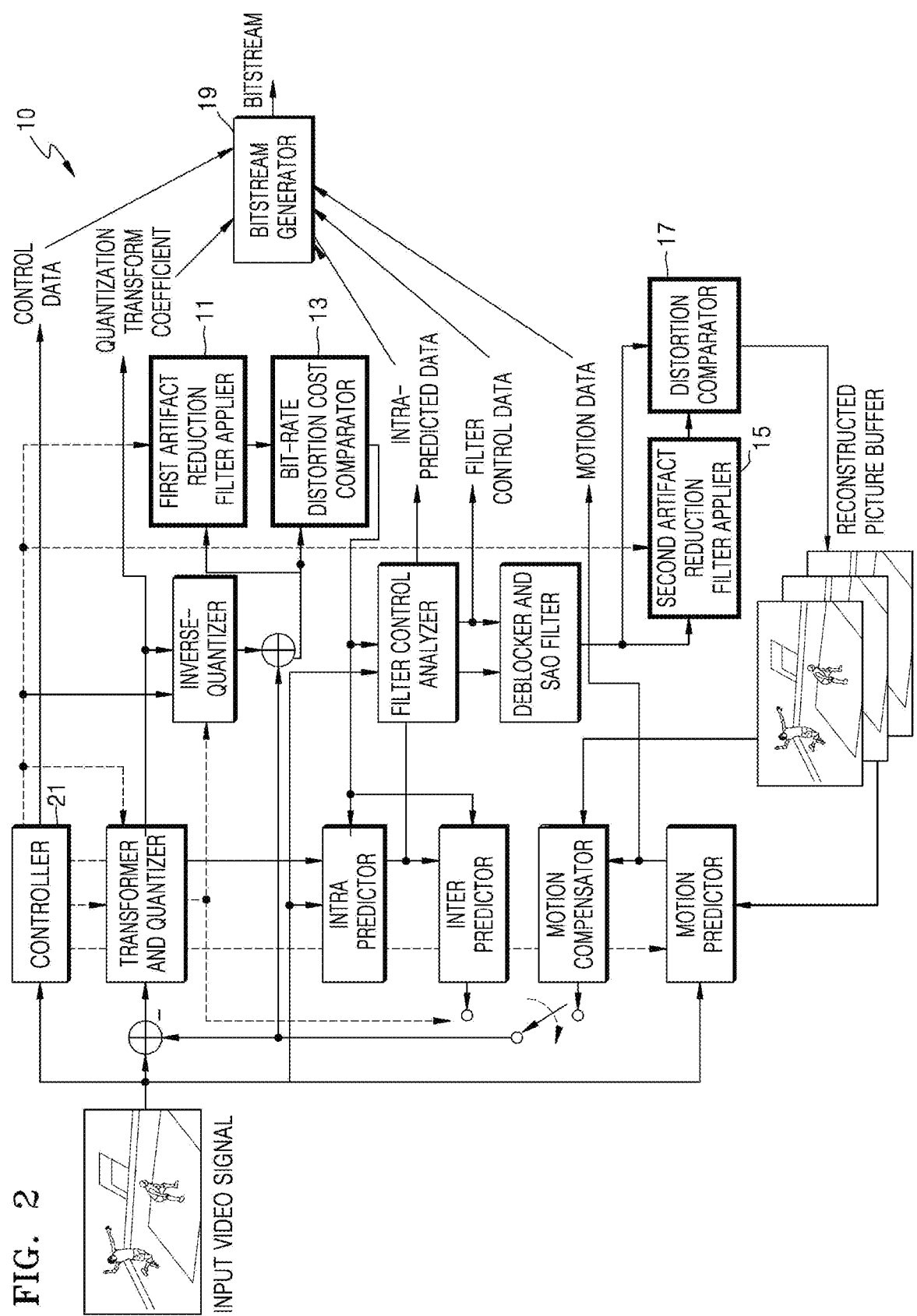

FIGS. 1 and 2 are block diagrams of an image encoding apparatus 10, according to some embodiments.

Referring to FIG. 1, the image encoding apparatus 10 according to the present embodiment may include a first artifact reduction filter applier 11, a bit-rate distortion cost comparator 13, a second artifact reduction filter applier 15, a distortion comparator 17, and a bitstream generator 19. The various modules and components shown in FIG. 1 and other figures may be implemented with software (e.g., instructions, programs, code, etc.), hardware (e.g., circuits, microchips, processors, etc.), or a combination of both. Referring to FIG. 2, the image encoding apparatus 10 may further include a controller 21, in addition to the first artifact reduction filter applier 11, the bit-rate distortion cost comparator 13, the second artifact reduction filter applier 15, the distortion comparator 17, and the bitstream generator 19. For example, the image encoding apparatus 10 may include the first artifact reduction filter applier 11, the bit-rate distortion cost comparator 13, the second artifact reduction filter applier 15, the distortion comparator 17, the bitstream generator 19, and a central processor. Alternatively, the first artifact reduction filter applier 11, the bit-rate distortion cost comparator 13, the second artifact reduction filter applier 15, the distortion comparator 17, and the bitstream generator 19 may be operated by individual processors, and the image encoding apparatus 10 may be a collection of the individual processors systematically interoperating with each other. Alternatively, the first artifact reduction filter applier 11, the bit-rate distortion cost comparator 13, the second artifact reduction filter applier 15, the distortion comparator 17, and the bitstream generator 19 may be controlled by an external processor of the image encoding apparatus 10.

The first artifact reduction filter applier 11 according to the present embodiment may generate a first picture that was reconstructed by using a residual picture and a predicted picture. In addition, the first artifact reduction filter applier 11 may generate a second picture by applying a first artifact reduction filter to the first picture.

The first artifact reduction filter may be a filter that is applied to the image encoding apparatus 10, the filter being used in a post-processing process in a display after an image decoding apparatus 40 reconstructed an image.

The bit-rate distortion cost comparator 13 according to the present embodiment may determine a picture having a smaller bit-rate distortion cost from among the first and second pictures by comparing a bit-rate distortion cost of the first picture with a bit-rate distortion cost of the second picture. The bit-rate distortion cost may be measured by using a rate-distortion optimization technique. For example, because the second picture is a picture obtained by applying the first artifact reduction filter to the first picture, a bit-rate and distortion of the second picture may be smaller than those of the first picture. Thus, the bit-rate distortion cost comparator 13 may determine that the bit-rate distortion cost of the second picture is smaller than that of the first picture.

The second artifact reduction filter applier 15 according to the present embodiment may generate a third picture by applying an in-loop filter to the picture having the smaller bit-rate distortion cost from among the first and second pictures. For example, when the second artifact reduction filter applier 15 receives, from the bit-rate distortion cost comparator 13, an input of the second picture as the picture having the smaller bit-rate distortion cost, the second artifact reduction filter applier 15 may generate the third picture by applying the in-loop filter to the second picture. In addition, the second artifact reduction filter applier 15 may generate a fourth picture by applying a second artifact reduction filter to the third picture.

The first artifact reduction filter and the second artifact reduction filter may be the same. Alternatively, the first artifact reduction filter and the second artifact reduction filter may be different from each other. For example, the first artifact reduction filter may be applied to a coding unit, and the second artifact reduction filter may be applied to a slice unit.

The distortion comparator 17 may determine a picture having smaller distortion from among the third and fourth pictures by comparing distortion of the third picture with distortion of the fourth picture. Because bitrates of the third and fourth pictures are equal, the distortion comparator 17 does not need to compare bit-rate distortion costs and may compare only the distortions. The picture having smaller distortion from among the third and fourth pictures may be equal to a picture having a smaller bit-rate distortion cost from among the third and fourth pictures. For example, the distortion comparator 17 may compare the distortion of the third picture with the distortion of the fourth picture and thus may determine that the distortion of the fourth picture is smaller than that of the third picture. In this case, the distortion of the fourth picture may be reduced by the second artifact reduction filter, compared to that of the third picture. Alternatively, the distortion comparator 17 may compare the distortion of the third picture with the distortion of the fourth picture and thus may determine that the distortion of the third picture is smaller than that of the fourth picture. In this case, although the second artifact reduction filter has been applied thereto, the distortion of the fourth picture is not reduced by the second artifact reduction filter, such that it is determined that the distortion of the third picture is small.

The image encoding apparatus 10 may further include a second artifact reduction filter updater configured to update the second artifact reduction filter so as to reduce the distortions of the third and fourth pictures, based on evaluated subjective and objective qualities. For example, when it is determined that the distortion of the fourth picture is not smaller than the distortion of the third picture, the fourth picture being generated by applying the second artifact reduction filter to the third picture, the second artifact reduction filter updater may update the second artifact reduction filter.

To determine the distortions of the third and fourth pictures, the distortion comparator 17 may evaluate subjective quality and objective quality of each of the third and fourth pictures.

In the present embodiment, the distortion comparator 17 may evaluate the subjective quality of each of the third and fourth pictures, based on a size of a display and a distance between the display and a viewer. The distortion comparator 17 may determine sharpness of each of the third and fourth pictures which is a criterion in evaluation of the subjective quality, based on sharpness of each of blocks in the third and fourth pictures. Sharpnesses of the blocks may be differently determined among respective modes of the blocks. The modes may be different from each other according to whether each block is a movement area (e.g., an area in which a depicted object in an image is in motion) and whether each block is a texture region or an edge region. The edge region may be an area of an image where an edge of an object is depicted. The texture region may be a non-edge region of an image where an interior space of an object instead of an edge of the object is depicted. The sharpness of each of the third and fourth pictures may be determined by applying different weights to the sharpnesses of the blocks, respectively, according to the size of the display and the distance between the display and the viewer, and this will be described below with reference to FIG. 6.

In the present embodiment, the distortion comparator 17 may extract colorfulness feature points, contrast feature points, and sharpness feature points from the third picture and the fourth picture, and may extract a colorfulness feature point, a contrast feature point, and a sharpness feature point from a high dynamic range (HDR) picture. The distortion comparator 17 may evaluate the objective quality of the third picture, based on a difference between the colorfulness feature point of the third picture and the colorfulness feature point of the HDR picture, a difference between the contrast feature point of the third picture and the contrast feature point of the HDR picture, and a difference between the sharpness feature point of the third picture and the sharpness feature point of the HDR picture. Also, the distortion comparator 17 may evaluate the objective quality of the fourth picture, based on a difference between the colorfulness feature point of the fourth picture and the colorfulness feature point of the HDR picture, a difference between the contrast feature point of the fourth picture and the contrast feature point of the HDR picture, and a difference between the sharpness feature point of the fourth picture and the sharpness feature point of the HDR picture. Evaluation of objective quality of a picture according to an embodiment will be described below with reference to FIG. 7.

The bitstream generator 19 may encode an image of a picture unit in an input image sequence. The bitstream generator 19 may perform motion estimation, inter prediction, intra prediction, frequency transformation, quantization, or the like on the input image, thereby generating encoded image data.

The bitstream generator 19 may encode the image by using various video encoding methods including Moving Picture Experts Group 1 (MPEG-1), MPEG-2, MPEG-4, H.26x, or the like, thereby generating a bitstream. For example, the bitstream generator 19 may use a video encoding method based on hierarchical data units according to regions according to an embodiment, wherein the video encoding method is to be described below with reference to FIGS. 8 through 27.

The bitstream generator 19 may generate and output a bitstream including information about whether the second artifact reduction filter is applied and encoded image data. For example, the encoded image data may be transformed to the bitstream via entropy encoding. In addition, for example, the bitstream generator 19 may receive, from the second artifact reduction filter applier 15, an input of the information about whether the second artifact reduction filter is applied, may encode the information, and may insert the information into the bitstream. The image encoding apparatus 10 may provide, to the image decoding apparatus 40, the information about whether the second artifact reduction filter is applied, the information being obtained in an encoding process, so as to allow the image decoding apparatus 40 to determine whether the second artifact reduction filter is applied to a decoded picture.

Figure 3:
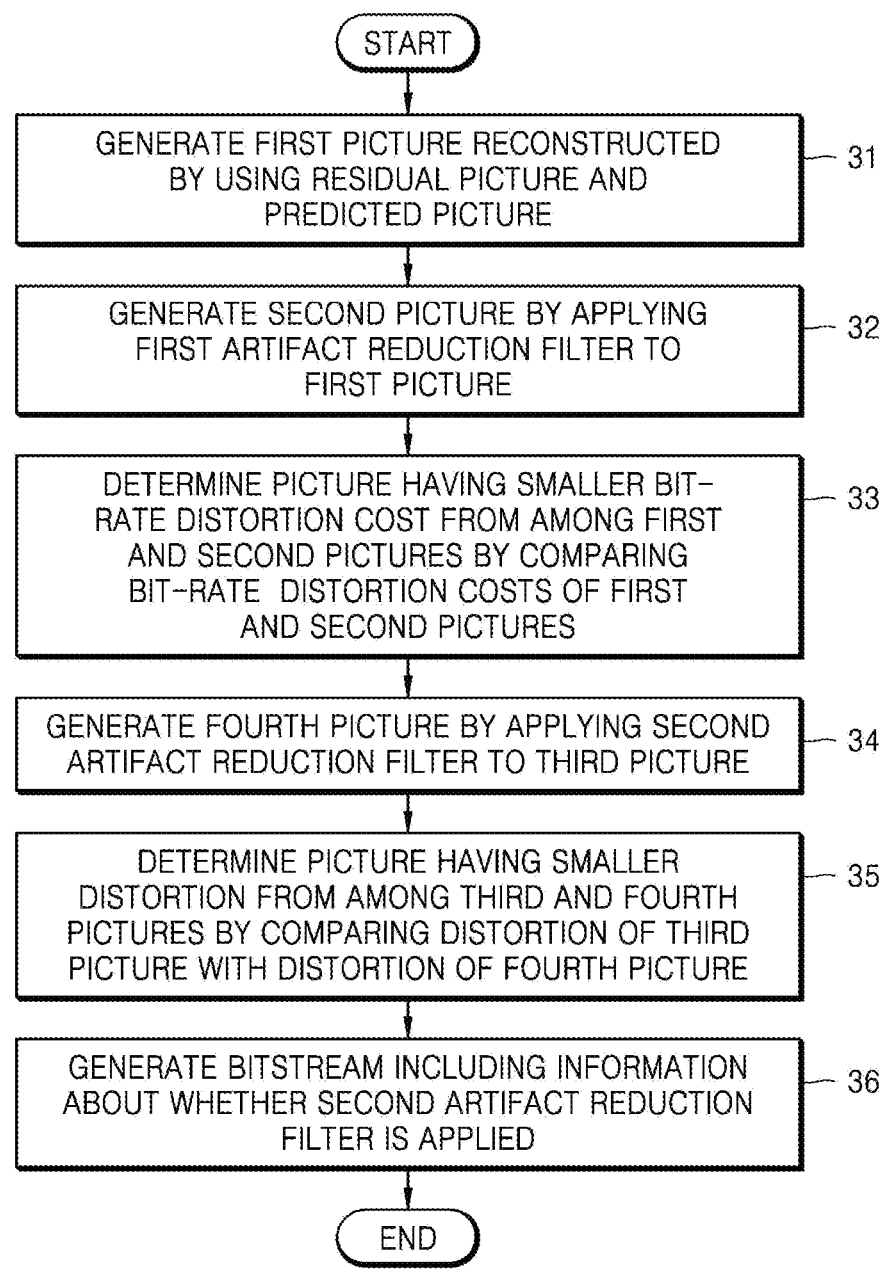
FIG. 3 is a flowchart of an image encoding method, according to an embodiment.

FIG. 3 is a flowchart of an image encoding method, according to an embodiment.

In operation 31, a first picture that was reconstructed by using a residual picture and a predicted picture may be generated.

In operation 32, a second picture may be generated by applying a first artifact reduction filter to the first picture.

In operation 33, a picture having a smaller bit-rate distortion cost from among the first and second pictures may be determined by comparing a bit-rate distortion cost of the first picture with a bit-rate distortion cost of the second picture.

In operation 34, a fourth picture may be generated by applying a second artifact reduction filter to a third picture. In operation 35, a picture having smaller distortion from among the third and fourth pictures may be determined by comparing distortion of the third picture with distortion of the fourth picture. To determine the distortions of the third and fourth pictures, subjective quality and objective quality of each of the third and fourth pictures may be evaluated. For example, the subjective quality of each of the third and fourth pictures may be evaluated based on a size of a display and a distance between the display and a viewer. In addition, to evaluate the subjective quality, sharpness of each of the third and fourth pictures may be determined based on sharpness of each of blocks in the third and fourth pictures. For example, sharpnesses of the blocks may be differently determined among respective modes of the blocks, and the modes may be different from each other according to whether each block is a movement region and whether each block is a texture region or an edge region. In addition, the sharpness of each of the third and fourth pictures may be determined by applying different weights to the sharpnesses of the blocks, respectively, according to the size of the display and the distance between the display and the viewer.

In the present embodiment, to evaluate the objective quality of each of the third and fourth pictures, colorfulness feature points, contrast feature points, and sharpness feature points may be extracted from the third picture and the fourth picture, and a colorfulness feature point, a contrast feature point, and a sharpness feature point may be extracted from an HDR picture. The objective quality of the third picture may be evaluated based on a difference between the colorfulness feature point of the third picture and the colorfulness feature point of the HDR picture, a difference between the contrast feature point of the third picture and the contrast feature point of the HDR picture, and a difference between the sharpness feature point of the third picture and the sharpness feature point of the HDR picture. A method of evaluating the objective quality of the fourth picture may be equal to that of evaluating the objective quality of the third picture.

In addition, based on the evaluated subjective quality and the evaluated objective quality, the second artifact reduction filter may be updated to reduce the distortions of the third and fourth pictures. For example, in a case where the distortion of the fourth picture is not smaller than that of the third picture, the second artifact reduction filter may be updated to reduce the distortion of the fourth picture.

Figure 4:
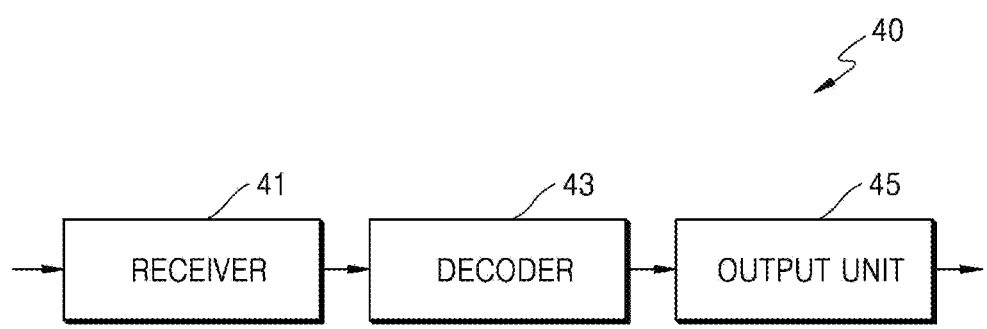
FIG. 4 is a block diagram of an image decoding apparatus, according to an embodiment.

In operation 36, a bitstream including information about whether the second artifact reduction filter is applied may be generated. In the present embodiment, the bitstream including the information about whether the second artifact reduction filter is applied and encoded image data may be generated and may be transmitted to the image decoding apparatus 40 as shown in FIG. 4. According to the image encoding method according to the present embodiment, because an artifact reduction filter that is used in the display is applied to the encoding process, different displays may exhibit substantially same subjective quality and same objective quality.

FIG. 4 is a block diagram of the image decoding apparatus 40, according to an embodiment.

The image decoding apparatus 40 according to the present embodiment may include a receiver 41, a decoder 43, and an output unit 45.

The receiver 41 according to the present embodiment may receive and parse a bitstream including information about whether to apply a second artifact reduction filter after an in-loop filter is applied.

The decoder 43 according to the present embodiment may extract, from the bitstream parsed by the receiver 41, encoded image data and the information about whether to apply the second artifact reduction filter after the in-loop filter is applied. For example, the information about whether to apply the second artifact reduction filter after the in-loop filter is applied may indicate information about whether to additionally apply the second artifact reduction filter after the in-loop filter is applied or whether to apply only the in-loop filter without applying the second artifact reduction filter. In addition, the decoder 43 may extract encoding information including an encoding scheme, an encoding mode, or the like, which is required to decode the encoded image data.

The decoder 43 according to the present embodiment may receive an input of the encoded image data, the information about whether to apply the second artifact reduction filter after the in-loop filter is applied, the encoding information, or the like, and may perform decoding on a plurality of pieces of the information, thereby reconstructing an image. Decoding with respect to the encoded image data may be performed as an inverse-process of the video encoding method performed on the encoded image data. For example, when the encoded image data is encoded by using a video encoding method based on hierarchical data units of regions according to an embodiment, and then is transmitted, the decoder 43 may decode the image data by using a video decoding method based on hierarchical data units according to regions.

The decoder 43 may selectively perform deblocking filtering or in-loop filtering such as sample adaptive offset (SAO) or the like on decoded image data.

The output unit 45 according to the present embodiment may selectively apply the second artifact reduction filter, based on the information about whether to apply the second artifact reduction filter after the in-loop filter is applied. For example, when the information indicates that the second artifact reduction filter is to be applied after the in-loop filter is applied, the second artifact reduction filter may be applied to a reconstructed picture to which the in-loop filter has been applied. Accordingly, a picture obtained by sequentially applying the in-loop filter and the second artifact reduction filter to a picture reconstructed by the decoder 43 may be output. Alternatively, when the information indicates that the second artifact reduction filter is not to be applied after the in-loop filter is applied, the reconstructed picture to which the in-loop filter has been applied may be output.

Figure 5:
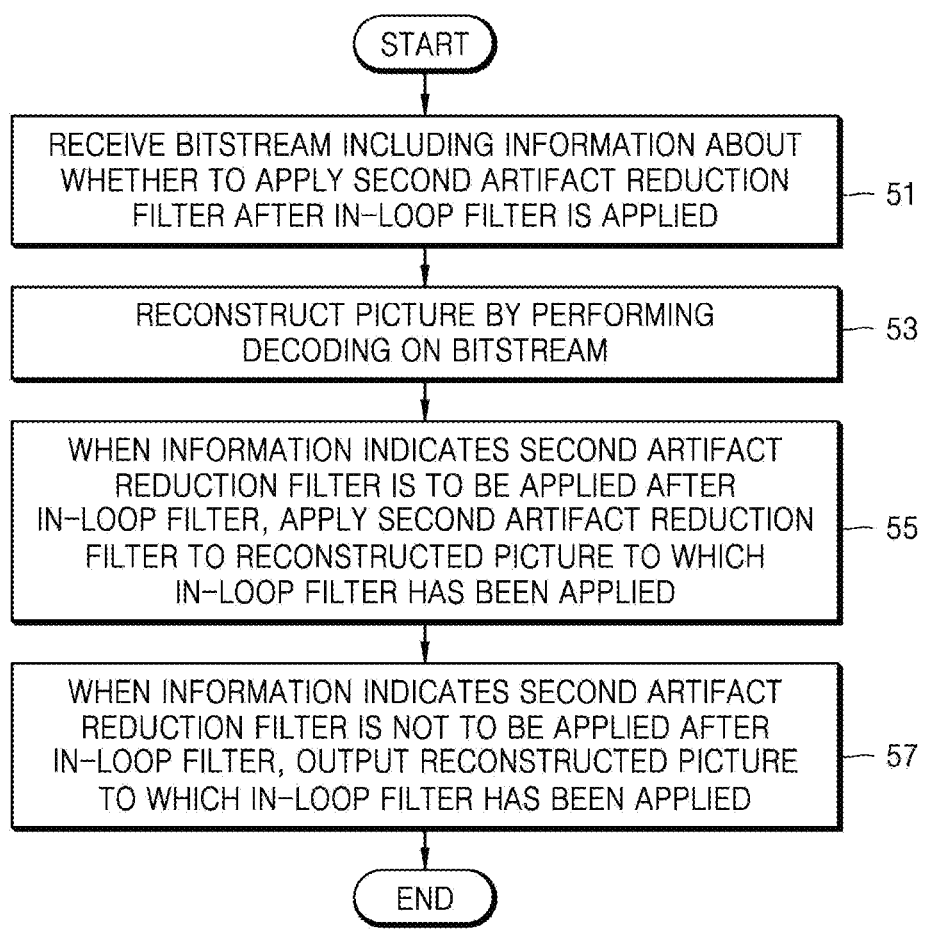
FIG. 5 is a flowchart of an image decoding method, according to an embodiment.

FIG. 5 is a flowchart of an image decoding method, according to an embodiment.

In operation 51, a bitstream including information about whether to apply a second artifact reduction filter after an in-loop filter is applied may be received.

In operation 53, a picture may be reconstructed by performing decoding on the bitstream.

In operation 55, when the information about whether to apply the second artifact reduction filter indicates that the second artifact reduction filter is to be applied after the in-loop filter is applied, the second artifact reduction filter may be applied to a reconstructed picture to which the in-loop filter has been applied.

In operation 57, when the information about whether to apply the second artifact reduction filter indicates that the second artifact reduction filter is to be applied after the in-loop filter is applied, the reconstructed picture to which only the in-loop filter has been applied may be output.

Thus, a picture in which rate-distortion is optimized may be output by using the image decoding method.

Figure 6:
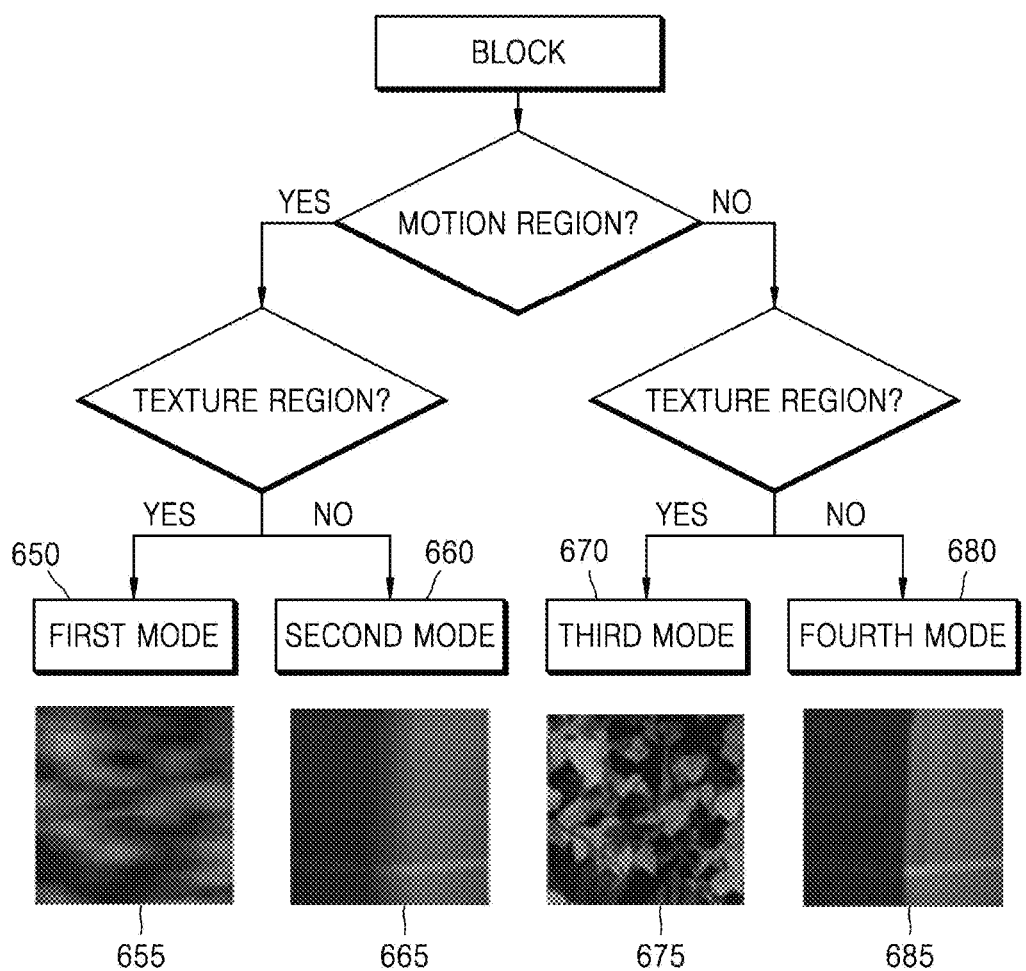
FIG. 6 illustrates an example in which modes are determined among respective modes, according to an embodiment.

FIG. 6 illustrates an example in which modes are determined among respective modes, according to an embodiment.

Referring to FIG. 6, a recognition resolution according to a viewing structure may be measured from a picture, modes may be classified based on frequency features according to respective blocks of the picture, and different sharpness measuring algorithms according to the classified modes may be applied. Also, sharpness of the picture may be derived by using spatial pooling based on a human vision system. In addition, final video sharpness may be derived by applying temporal pooling to the sharpness of the picture.

The recognition resolution may be derived by the number of pixels a human eye can recognize per 1° to a display. The number of pixels which is relatively recognized by a display size $l_x$, a resolution $N_x$, and a viewing distance z is calculated by using Equation 1.

$$N(N_x, l_x, z) = \frac{N_x}{l_x} * z * \tan\left(\frac{\pi}{180}\right) \quad \text{[Equation 1]}$$

A resolution ratio $\hat{N}/N$ in which actual human eyes view may be calculated based on a recognition resolution N obtained by using Equation 1 and a resolution $\hat{N}$ indicating a resolution discernable by human retinas. In addition, frequency transformation may be performed by up-sampling or down-sampling an image by applying the resolution ratio $\hat{N}/N$ thereto.

In the present embodiment, the image encoding apparatus 10 may measure a size of a motion vector for each of pixels in a block. For example, the image encoding apparatus 10 may use an optical flow algorithm to measure the size of the motion vector. After the size of the motion vector for each pixel is obtained, the image encoding apparatus 10 may calculate an average motion size V(n) with respect to a block n. When V(n) exceeds a predetermined threshold value $V^{th}$, the image encoding apparatus 10 may determine the block as a motion region 620.

In addition, the image encoding apparatus 10 may transform each block to a frequency band by performing discrete Fourier transform (DFT) on each block. The image encoding apparatus 10 may determine the frequency band of each block to be one of a DC, a low frequency (LF), a middle frequency (MF), and a high frequency (HF). The image encoding apparatus 10 may measure energy of the frequency band and thus may determine texture energy that is a total sum of a MF and a HF.

When the texture energy exceeds a predetermined threshold value, the image encoding apparatus 10 may determine the block as a texture region, and when the texture energy does not exceed the predetermined threshold value, the image encoding apparatus 10 may determine the block as an edge region. As described above, the image encoding apparatus 10 may determine the block to correspond to one of four modes by determining whether the block is a motion region and whether the block is the texture region or the edge region. A first mode 650 indicates a mode of the block that is a motion region and a texture region, a second mode 660 indicates a mode of the block that is a motion region and an edge region, a third mode 670 indicates a mode of the block that is a non-motion region and a texture region, and a fourth mode 680 indicates a mode of the block that is a non-motion region and an edge region A block 655 corresponding to the first mode 650 may include many blur motions (i.e., more than the third mode 690 or the fourth mode 680) and least edges (i.e., fewer than the second mode 660). A block 665 corresponding to the second mode 660 may include many blur motions (i.e., more than the third mode 690 or the fourth mode 680) and few edges. Also, a block 675 corresponding to the third mode 670 may include few blur motions and least edges (i.e., fewer than the fourth mode 680). A block 685 corresponding to the fourth mode 680 may include few blur motions and edges.

In the present embodiment, sharpnesses of the blocks in the picture may be differently determined according to respective modes of the blocks. For example, respective sharpnesses s of the blocks may vary according to modes, as shown in Table 1.

TABLE 1

Local sharpness score: $s = \overline{DS}^\eta \times \left(\frac{c}{\widetilde{DS} + c}\right)^{1-\eta}$ mode 1: Motion Blur / texture $\cdot \overline{DS} = DS(\psi_{motion}) \qquad \cdot \widetilde{DS} = \sigma \frac{s_\phi}{\mu_{s_\phi}}$ mode 2: Motion Blur / edge $\cdot \overline{DS} = DS(\psi_{motion}) \qquad \cdot \widetilde{DS} = 0$ mode 3: Motion Blur x / texture $\cdot \overline{DS} = \frac{1}{N_{dr}} \sum_{n=1}^{N_{dr}} DS(\phi_n) \qquad \cdot \widetilde{DS} = \frac{\sigma_{s_\phi}}{\mu_{s_\phi}}$ mode 4: Motion Blur x /edge $\cdot \overline{DS} = DS(\psi_{edge}) \qquad \cdot \widetilde{DS} = 0$ The image encoding apparatus 10 may calculate directional sharpness $\overline{DS}$ and dispersion $\widetilde{DS}$ according to the directional sharpness $\overline{DS}$ so as to derive sharpness according to each mode. Sharpness s of a block is calculated by using Equation 2 below.

$$s = \overline{DS}^\eta * \left(\frac{c}{\widetilde{DS} + c}\right)^{1-\eta} \quad \text{[Equation 2]}$$

Equation 2 indicates that the directional sharpness $\overline{DS}$ is decreased due to a defocused blur, and a frequency distribution is inclined in a particular direction in a frequency spectrum according to motions, such that the dispersion $\overline{DS}$ as the directional sharpness $\overline{DS}$ is increased. For example, η=0.5, c=0.001².

The directional sharpness $\overline{DS}$ may reflect a decrease in sharpness of an image due to shaking of a camera or a movement of an object in the image. In addition, the directional sharpness $\overline{DS}$ may be determined based on a frequency distribution and energy in each direction of the frequency spectrum.

$$DE(\phi_n) = \left[\sum_{u=-N/2}^{N/2} \left|\frac{C_{\phi_n}(u)}{B(0,0)}\right|^2\right]^{-\frac{1}{2}} \qquad [\text{Equation 3}]$$

In Equation 3, $C_{\phi_n}(u)=\{B(u,u\ \tan(\phi_n))|u\in(-N/2,N/2)\}$ indicates a DFT coefficient of an image in an $\phi_n$ direction, B(u, v) indicates an (u,v)-th DFT coefficient of the image, and N indicates a size of a DFT block. Also, $\phi_n=\{\phi_1, \phi_2, K, \phi_{N_\phi}\}$ indicates an n-th direction, and $N_{dr}$ indicates a coefficient of a direction.

$$DV(\phi_n) = \sum_{u=-N/2}^{N/2} p_{\phi_n}(u)[f_{\phi_n}(u) - \mu_{\phi_n}]^2 \qquad [\text{Equation 4}]$$

In Equation 4, $$f_{\phi_n}(u) = sgn(u) \cdot \frac{\sqrt{u^2 + u^2 \cdot \tan^2(u)}}{N}$$

indicates a normalized frequency, and sgn(·) indicates a signum function. Also, $$p_{\phi_n}(u) = \frac{|C_{\phi_n}(u)|^2}{\sum_{u'=-N/2}^{N/2}|C_{\phi_n}(u')|^2}$$

indicates a probability mass function of a normalized power spectrum in each direction $\phi_n$, and $$\mu_{\phi_n} = \sum_{u=-N/2}^{N/2} p_{\phi_n}(u) f_{\phi_n}(u)$$

indicates a first central moment of the power spectrum in each direction $\phi_n$.

$$DS(\phi_n) = DE(\phi_n) * DV(\phi_n) \qquad [\text{Equation 5}]$$

As in Equation 5, directional sharpness $DS(\phi_n)$ in each direction $\phi_n$ may be expressed as multiplication of directional energy $DE(\phi_n)$ and dispersion $DV(\phi_n)$.

As described above, after sharpness of each block is determined, sharpness of a picture may be derived by using spatial pooling. For example, the spatial pooling may include a pooling scheme to which a weight according to foveation and a weight based on a visually-emphasized region are applied.

In the present embodiment, the sharpness of the picture may be derived by applying a weight according to foveation $w_{fov}$ and a weight based on a visually-emphasized region $w_s$ to the sharpness s of each block. Sharpness of each picture $\hat{s}(t)$ according to the spatial pooling is obtained by using Equation 6.

$$\hat{s}(t) = \frac{\sum_X w_s(X) * \frac{\sum_{X_\Omega \in \Omega} w_{fov}(X_\Omega) * S(X)}{\sum_{X_\Omega \in \Omega} w_{fov}(X_\Omega)}}{\sum_X w_s(X)} \qquad [\text{Equation 6}]$$

In Equation 6, $w_s(X)$ indicates a level of a visually-emphasized region in a certain pixel X in a picture, $w_{fov}$ indicates a weight according to foveation, and S(X) indicates a sharpness score in the pixel X. In the present embodiment, $w_s(X)$ may be derived by using an algorithm for predicting a visually-emphasized region, and $w_{fov}$ may reflect that the number of visual cells is decreased as it becomes more distant from a center of an eye retina and may be calculated by using Equation 7.

$$w_{fov} = \frac{f_c(X_\Omega)}{\max[f_c(X_\Omega)]}, f_c(X_\Omega) = \frac{e_2 \ln\left(\frac{1}{C_{th}}\right)}{\alpha[e_2 + e(X_\Omega)]} \qquad [\text{Equation 7}]$$

For example, $C_{th}=1/64$, $\alpha=0.106$, $e_2=2.3$, and $e(X_\Omega)$ may be $$\tan^{-1}\left(\frac{d(X_\Omega)}{z}\right).$$

In the present embodiment, video sharpness may be derived from sharpness of a picture by using temporal pooling. For example, the temporal pooling may include a pooling scheme to which a weight according to a motion is applied.

Video sharpness S according to the temporal pooling may be derived by using Equation 8.

$$S = \frac{\sum_t w_{motion}(t) * \hat{s}(t)}{\sum_t w_{motion}(t)} \qquad [\text{Equation 8}]$$

A score of the video sharpness S may be determined according to the sharpness of each picture $\hat{s}(t)$ and a weight $w_{motion}$. The weight $w_{motion}$ may reflect that sharpness recognized by a person is decreased when a motion of a camera or an object is great, and may be calculated by using Equation 9.

$$w_{motion} = 1 - \frac{|R_{motion}|}{N_x N_y} \qquad [\text{Equation 9}]$$

$|R_{motion}|$ denotes the number of pixels corresponding to the third mode 630 or the fourth mode 640. Regarding a value of $w_{motion}$, the value is decreased when a range of a motion is increased, thus, a value of recognized sharpness is decreased.

Figure 7:
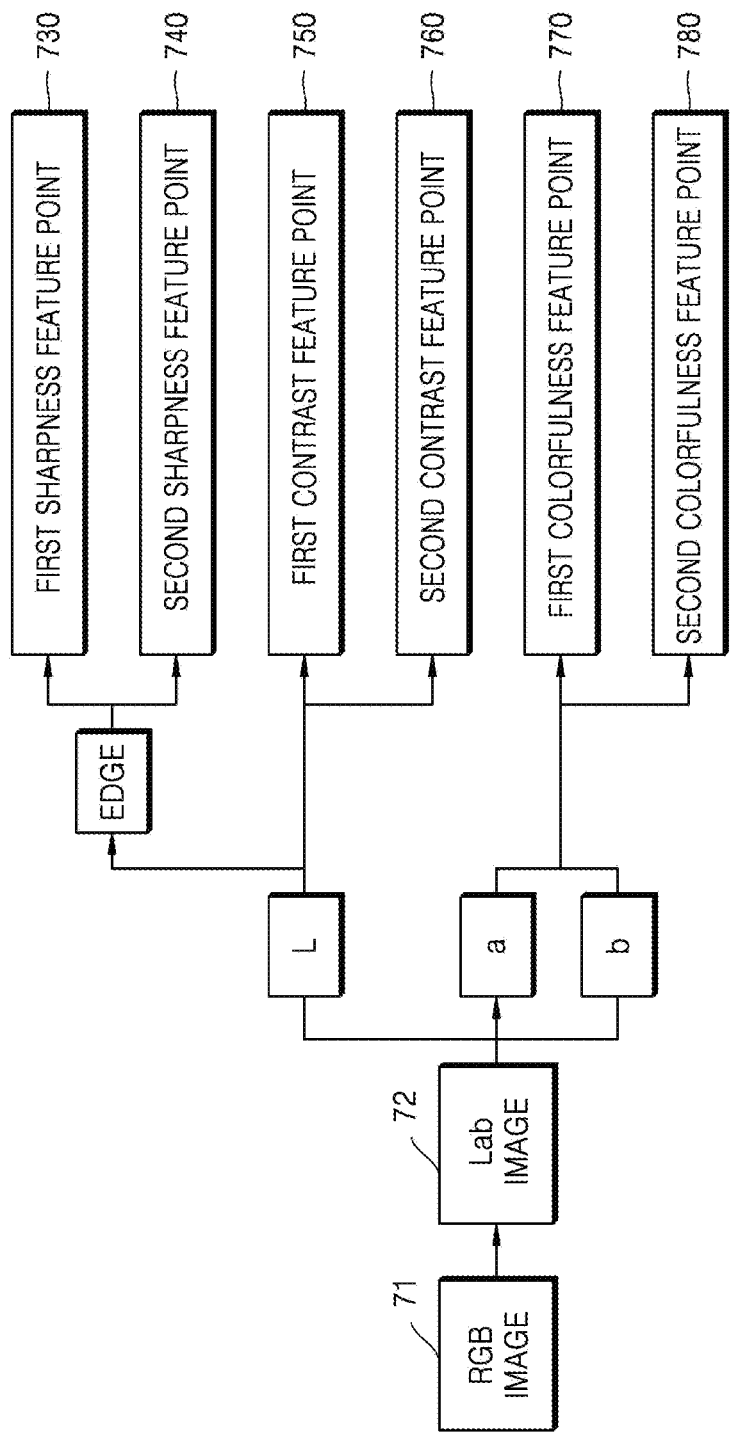
FIG. 7 illustrates an example in which objective quality of an image is evaluated, according to an embodiment.

FIG. 7 illustrates an example in which objective quality of an image is evaluated, according to an embodiment. Referring to FIG. 7, six feature points 730 to 780 according to colorfulness, contrast, and sharpness of an image to be evaluated are compared with six feature points in an HDR image, such that a score of image evaluation may be obtained.

The image encoding apparatus 10 may obtain, from an image, two feature points from each of colorfulness, contrast, and sharpness, which makes a total of six feature points. For example, the image encoding apparatus 10 may transform an image 71 consisting of RGB channels to an image 72 consisting of Luminance-Chromatic (Lab) channels, and then may obtain colorfulness feature points from an a-b region, and contrast and sharpness feature points from an L region. In the present embodiment, the colorfulness feature points may be obtained by using Equation 1 and Equation 2.

$$C(a, b) = 0.02 \times \log\left(\frac{\sigma_a^2}{|\mu_a|^{0.2}}\right) \times \log\left(\frac{\sigma_b^2}{|\mu_b|^{0.2}}\right) \qquad \text{[Equation 10]}$$

Figure 10:
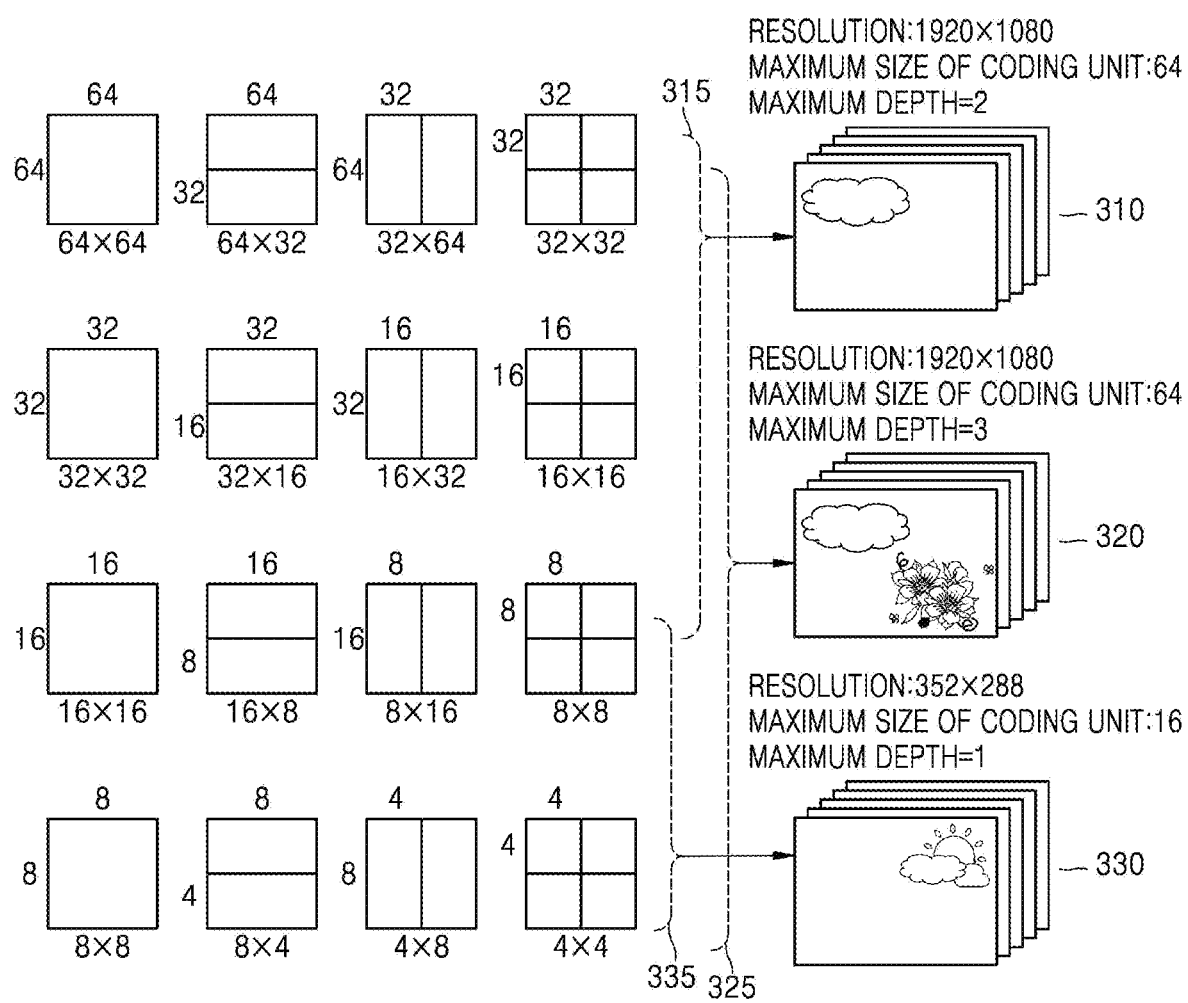
FIG. 10 illustrates a concept of coding units, according to various embodiments.

$\sigma_a^2$ and $\sigma_b^2$ denote dispersion of a chromatic component in an image, and $\mu_a$ and $\mu_b$ denote average values. C(a, b) indicates a color distribution in an entire image, i.e., a level of colorfulness. Referring to FIG. 10, when a chromatic component is increased, colorfulness is also increased.

$$\sigma(i, j) = \sqrt{\sum_{k=-K}^{K} \sum_{l=-L}^{L} \omega_{k,l}(R_{k,l(i,j)} - \mu(i, j))^2} \qquad \text{[Equation 11]}$$

$\sigma(i, j)$ in Equation 11 denotes a feature point indicating a value of a standard deviation of a chromatic a-b component, and as a feature point in Equation 10, the feature point of Equation 11 indicates a level of a distribution of a chromatic component. Values of the two feature points in Equation 10 and Equation 11 have a tendency to be linearly changed when colorfulness is increased in an image.

As in colorfulness, two feature points indicating contrast may be derived by using Equation 12 and Equation 13.

$$C(L) = \frac{1}{k_1 k_2} \sum_{l=1}^{k_1} \sum_{k=1}^{k_2} \left(\log\left(\frac{L_{max,k,l} + L_{min,k,l}}{L_{max,k,l} - L_{min,k,l}}\right)\right)^{-0.5} \qquad \text{[Equation 12]}$$

L may denote a luminance value that is a value indicating intensity of an image except for color information. A contrast feature point C(L) may be derived by using a value obtained by dividing a difference between a largest value $L_{max,k,l}$ in a block and a smallest value $L_{min,k,l}$ by a sum of $L_{max,k,l}$ and $L_{min,k,l}$. A value of C(L) is increased when a histogram of the image becomes wider. A feature point by Equation 12 may be calculated for each block, and one feature point may be derived from each picture according to spatial pooling using an average value of each block.

$$\sigma(i, j) = \sqrt{\sum_{k=-K}^{K} \sum_{l=-L}^{L} \omega_{k,l}(L_{k,l(i,j)} - \mu(i, j))^2} \qquad \text{[Equation 13]}$$

As in Equation 11, a second contrast feature point may be obtained by using a standard deviation. The feature point obtained by using Equation 13 may vary according to a distribution of a histogram of an image. When a contrast is increased, σ(i, j) is also increased.

As in colorfulness and contrast described above, two feature points may be derived from sharpness.

$$EME(I) = \frac{2}{k_1 k_2} \sum_{l=1}^{k_1} \sum_{k=1}^{k_2} \log\left(\frac{I_{max,k,l}}{I_{min,k,l}}\right) \qquad \text{[Equation 14]}$$

In Equation 14, a value of I indicates an edge component of an image and may be obtained by multiplying a luminance value of an original image by a binary edge value obtained based on Sobel edge detection. Thus, I may indicate a high frequency component of the image. An edge value for each block may be calculated by using Equation 14, and one sharpness feature point may be derived from each picture by using spatial pooling. When a high frequency component of a picture is increased, a value of a sharpness feature point may also be increased.

$$\sigma(i, j) = \sqrt{\sum_{k=-K}^{K} \sum_{l=-L}^{L} \omega_{k,l}(I_{k,l(i,j)} - \mu(i, j))^2} \qquad \text{[Equation 15]}$$

As in Equation 11 and Equation 13, a sharpness feature point may be obtained by using a standard deviation of an edge component. When the edge component is increased in an image, σ(i, j) may be further increased.

As described above, six feature points obtained by using Equations 10 to 15 may be obtained from each of an HDR image and an image to be evaluated, and the six feature points may be compared between the HDR image and the image, such that objective quality of the image may be evaluated.

A score of evaluation with respect to the objective quality of the image may be derived by using Equation 16.

$$Q = a\Delta \text{Col}^\alpha + b\Delta \text{Sha}^\beta + c\Delta \text{Con}^\gamma \qquad \text{[Equation 16]}$$

Here, a, b, and c may each be a random real number. In addition, ΔCol may indicate a difference between colorfulness feature points of the HDR image and the image to be evaluated, ΔCon may indicate a difference between contrast feature points of the HDR image and the image to be evaluated, and ΔSha may indicate a difference between sharpness feature points of the HDR image and the image to be evaluated. The evaluation of the image may be performed in a non-reference condition.

Hereinafter, with reference to FIGS. 8 through 20, a video encoding method, a video encoding apparatus, a video decoding method, and a video decoding apparatus based on coding units having a tree structure and transform units, according to various embodiments, will be described.

Figure 8:
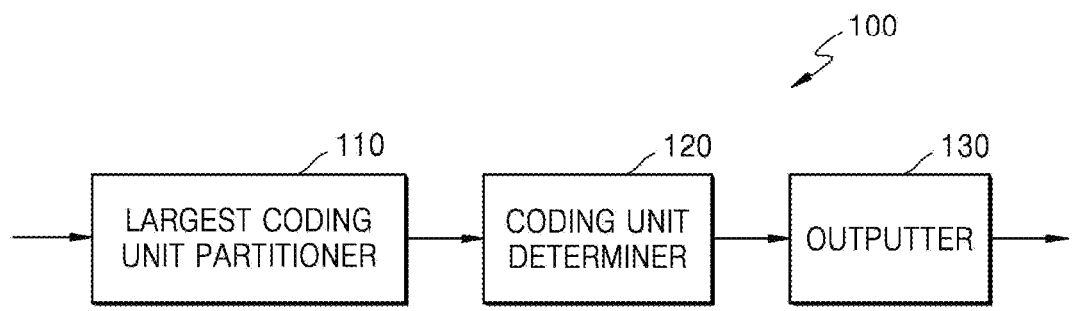
FIG. 8 is a block diagram of a video encoding apparatus based on coding units of a tree structure, according to an embodiment.

FIG. 8 is a block diagram of a video encoding apparatus based on coding units of a tree structure 100, according to an embodiment.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred to as the video encoding apparatus 100.

The image encoding apparatus 10 described above with reference to FIG. 1 may be a particular embodiment of the video encoding apparatus 100 according to the present embodiment. A largest coding unit partitioner 110 and a coding unit determiner 120 of the video encoding apparatus 100 may correspond to the bit-rate distortion cost comparator 13 of the image encoding apparatus 10, and an output unit 130 of the video encoding apparatus 100 may correspond to the bitstream generator 19 of the image encoding apparatus 10.

The coding unit determiner 120 may partition a current picture based on a largest coding unit that is a coding unit having a maximum size for a current picture of an image. When the current picture is larger than the largest coding unit, image data of the current picture may be partitioned into the at least one largest coding unit. The largest coding unit according to various embodiments may be a data unit having a size of 32×32, 64×64, 128×128, 256×256, etc., wherein a shape of the data unit is a square having a width and length in powers of 2.

A coding unit according to various embodiments may be characterized by a maximum size and a depth. The depth denotes the number of times the coding unit is spatially partitioned from the largest coding unit, and as the depth deepens, deeper coding units according to depths may be partitioned from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is partitioned into the largest coding units according to a maximum size of the coding unit, and each of the largest coding units may include deeper coding units that are partitioned according to depths. Since the largest coding unit according to various embodiments is partitioned according to depths, the image data of a spatial domain included in the largest coding unit may be hierarchically classified according to depths.

A maximum depth and a maximum size of a coding unit, which limit the total number of times a height and a width of the largest coding unit are hierarchically partitioned, may be predetermined.

The coding unit determiner 120 encodes at least one partitioned region obtained by partitioning a region of the largest coding unit according to depths, and determines a depth to output a finally encoded image data according to the at least one partitioned region. That is, the coding unit determiner 120 determines a final depth by encoding the image data in the deeper coding units according to depths, according to the largest coding unit of the current picture, and selecting a depth having the minimum encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one final depth may be selected for each largest coding unit.

The size of the largest coding unit is partitioned as a coding unit is hierarchically partitioned according to depths, and as the number of coding units increases. Also, even if coding units correspond to the same depth in one largest coding unit, it is determined whether to partition each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to various embodiments may determine coding units having a tree structure included in the current largest coding unit. The "coding units having a tree structure" according to various embodiments include coding units corresponding to a depth determined to be the final depth, from among all deeper coding units included in the current largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to various embodiments is an index related to the number of partitioning times from a largest coding unit to a smallest coding unit A first maximum depth according to various embodiments may denote the total number of partitioning times from the largest coding unit to the smallest coding unit. A second maximum depth according to various embodiments may denote the total number of depth levels from the largest coding unit to the smallest coding unit. For example, when a depth of the largest coding unit is 0, a depth of a coding unit, in which the largest coding unit is partitioned once, may be set to 1, and a depth of a coding unit, in which the largest coding unit is partitioned twice, may be set to 2. In this regard, when the smallest coding unit is a coding unit in which the largest coding unit is partitioned four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is partitioned according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to various embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit corresponding to a final depth according to various embodiments, i.e., based on a coding unit that is no longer partitioned to coding units corresponding to a lower depth. Hereinafter, the coding unit that is no longer partitioned and becomes a base unit for prediction encoding will now be referred to as a "prediction unit." A partition obtained by partitioning the prediction unit may include a prediction unit and a data unit obtained by partitioning at least one of a height and a width of the prediction unit. A partition is a data unit where a prediction unit of a coding unit is partitioned, and a prediction unit may be a partition having the same size as a coding unit.

For example, when a coding unit of 2N×2N (where N is a positive integer) is no longer partitioned, it becomes a prediction unit of 2N×2N, and a size of a partition may be 2N×2N, 2N×N, N×2N, or N×N. Examples of a partition mode may include symmetrical partitions obtained by symmetrically partitioning a height or width of the prediction unit, and may selectively include partitions obtained by asymmetrically partitioning the height or width of the prediction unit, such as 1:n or n:1 (where n is a positive integer), partitions obtained by geometrically partitioning the prediction unit, partitions having arbitrary shapes, or the like.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to various embodiments may perform not only the transformation on the image data in a coding unit based not only on the coding unit for encoding the image data, but also may perform the transformation on the image data based on a data unit that is different from the coding unit. In order to perform the transformation in the coding unit, the transformation may be performed based on a transform unit having a size smaller than or equal to the coding unit. For example, the transform unit may include a data unit for an intra mode and a transform unit for an inter mode.

The transform unit in the coding unit may be recursively partitioned into smaller sized regions in a manner similar to that in which the coding unit is partitioned according to the tree structure, according to various embodiments. Thus, residual data in the coding unit may be partitioned according to the transform unit having the tree structure according to transformation depths.

A transformation depth indicating the number of partitioning times to reach the transform unit by partitioning the height and width of the coding unit may also be set in the transform unit according to various embodiments. For example, in a current coding unit of 2N×2N, a transformation depth may be 0 when the size of a transform unit is 2N×2N, may be 1 when the size of the transform unit is N×N, and may be 2 when the size of the transform unit is N/2×N/2. That is, with respect to the transform unit, the transform unit having the tree structure may be set according to the transformation depths.

Partition information according to depths requires not only information about a depth but also requires information related to prediction and transformation. Accordingly, the coding unit determiner 120 may determine not only a depth generating a minimum encoding error but may also determine a partition mode in which a prediction unit is partitioned to partitions, a prediction mode according to prediction units, and a size of a transform unit for transformation.

Coding units according to a tree structure in a largest coding unit and methods of determining a prediction unit/partition, and a transform unit, according to various embodiments, will be described in detail later with reference to FIGS. 9 through 19.

The coding unit determiner 120 may measure an encoding error of deeper coding units according to depths by using rate-distortion optimization based on Lagrangian multipliers.

The output unit 130 outputs, in bitstreams, the image data of the largest coding unit, which is encoded based on the at least one depth determined by the coding unit determiner 120, and partition information according to depths.

The encoded image data may correspond to a result obtained by encoding residual data of an image.

The partition information according to depths may include depth information, partition mode information of the prediction unit, prediction mode information, and the partition information of the transform unit.

Final-depth information may be defined by using partition information according to depths, which specifies whether encoding is performed on coding units of a lower depth instead of a current depth. When the current depth of the current coding unit is a depth, the current coding unit is encoded by using the coding unit of the current depth, and thus partition information of the current depth may be defined not to partition the current coding unit to a lower depth. On the contrary, when the current depth of the current coding unit is not the depth, the encoding has to be performed on the coding unit of the lower depth, and thus the partition information of the current depth may be defined to partition the current coding unit to the coding units of the lower depth.

When the current depth is not the depth, encoding is performed on the coding unit that is partitioned into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of partition information has to be determined for a coding unit of a depth, at least one piece of partition information may be determined for one largest coding unit. Also, data of the largest coding unit may vary according to locations since the data is hierarchically partitioned according to depths, and thus a depth and partition information may be set for the data.

Accordingly, the output unit 130 according to various embodiments may assign encoding information about a corresponding depth and an encoding mode to at least one of the coding unit, the prediction unit, and a minimum unit included in the largest coding unit.

The minimum unit according to various embodiments is a square data unit obtained by partitioning the smallest coding unit constituting the lowermost depth by 4. Alternatively, the minimum unit according to various embodiments may be a maximum square data unit that may be included in all of the coding units, prediction units, partition units, and transform units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or groups of pictures (GOPs), and information about a maximum depth may be inserted into a header of a bitstream, a sequence parameter set, or a picture parameter set.

Information about a maximum size of the transform unit permitted with respect to a current video, and information about a minimum size of the transform unit may also be output through a header of a bitstream, a sequence parameter set, or a picture parameter set. The output unit 130 may encode and output reference information, prediction information, and slice type information, which are related to prediction.

According to an embodiment of the video encoding apparatus 100, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, when an image having a high resolution or a large data amount is encoded in a macroblock according to the related art, the number of macroblocks per picture increases by an excessive amount. Accordingly, the number of pieces of compressed information generated for each macroblock increases, and thus it is difficult to transmit the compressed information and data compression efficiency decreases. However, by using the video encoding apparatus 100 according to various embodiments, image compression efficiency may be increased since a coding unit is adjusted based on characteristics of an image while increasing a maximum size of a coding unit based on a size of the image.

Figure 9:
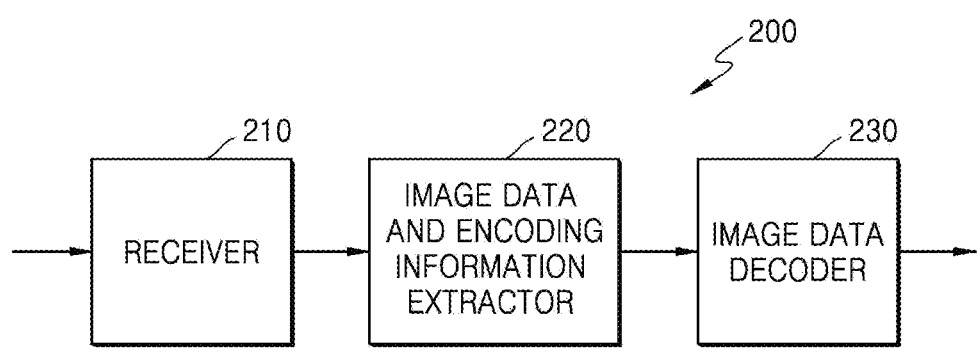
FIG. 9 is a block diagram of a video decoding apparatus based on coding units of a tree structure, according to an embodiment.

FIG. 9 is a block diagram of a video decoding apparatus based on coding units according to tree structure 200, according to various embodiments.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the "video decoding apparatus 200."

The image decoding apparatus 40 described above with reference to FIG. 4 is a particular embodiment of the video decoding apparatus 200 according to the present embodiment. The receiver 210 of the video decoding apparatus 200 may correspond to the receiver 41 of the image decoding apparatus 40, and the image data and encoding information extractor 220 and the image data decoder 230 of the video decoding apparatus 200 may correspond to the decoder 43 and the output unit 45 of the image decoding apparatus 40, respectively.

Definitions of various terms, such as a coding unit, a depth, a prediction unit, a transform unit, and various partition information, for decoding operations of the video decoding apparatus 200 according to various embodiments are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a final depth and partition information about the coding units having a tree structure according to each largest coding unit. The extracted final depth and the extracted partition information are output to the image data decoder 230. That is, the image data in a bitstream is partitioned into the largest coding unit so that the image data decoder 230 may decode the image data for each largest coding unit.

A depth and partition information according to each of the largest coding units may be set for one or more pieces of depth information, and partition information according to depths may include partition mode information of a corresponding coding unit, prediction mode information, and partition information of a transform unit. Also, as the depth information, the partition information according to depths may be extracted.

The depth and the partition information according to each of the largest coding units extracted by the image data and encoding information extractor 220 are depth and partition information determined to generate a minimum encoding error when an encoder, such as the video encoding apparatus 100, repeatedly performs encoding on each deeper coding unit according to depths according to each largest coding unit. Accordingly, the video decoding apparatus 200 may reconstruct an image by decoding data according to an encoding method that generates the minimum encoding error.

Since encoding information according to various embodiments about a depth and an encoding mode may be assigned to a predetermined data unit from among a corresponding coding unit, a prediction unit, and a minimum unit, the image data and encoding information extractor 220 may extract the depth and the partition information according to the predetermined data units. When a depth and partition information of a corresponding largest coding unit are recorded according to each of the predetermined data units, predetermined data units having the same depth and the partition information may be inferred to be the data units included in the same largest coding unit.

The image data decoder 230 may reconstruct the current picture by decoding the image data in each largest coding unit based on the depth and the partition information according to the largest coding units. That is, the image data decoder 230 may decode the encoded image data, based on a read partition mode, a prediction mode, and a transform unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, for inverse transformation for each largest coding unit, the image data decoder 230 may read information about a transform unit according to a tree structure for each coding unit so as to perform inverse transformation based on transform units for each coding unit. Due to the inverse transformation, a pixel value of a spatial domain of the coding unit may be reconstructed.

The image data decoder 230 may determine a depth of a current largest coding unit by using partition information according to depths. When the partition information indicates that image data is no longer to be partitioned in the current depth, the current depth is a final depth of a coding unit. Accordingly, the image data decoder 230 may decode the image data of the current largest coding unit by using the information about the partition mode of the prediction unit, the prediction mode, and the size of the transform unit for each coding unit corresponding to the current depth.

That is, data units containing the encoding information including the same partition information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has a high resolution or has an excessively large data amount, the image may be efficiently decoded and reconstructed by using a size of a coding unit and an encoding mode, which are adaptively determined according to characteristics of the image, by using optimal partition information received from an encoding terminal.

FIG. 10 is a diagram for describing a concept of coding units according to various embodiments.

A size of a coding unit may be expressed as "width× height," and may, for example, be 64×64, 32×32, 16×16, 8×8, etc. A coding unit of 64×64 may be partitioned into partitions of 64×64, 64×32, 32×64, or 32×32, and a coding unit of 32×32 may be partitioned into partitions of 32×32, 32×16, 16×32, or 16×16, a coding unit of 16×16 may be partitioned into partitions of 16×16, 16×8, 8×16, or 8×8, and a coding unit of 8×8 may be partitioned into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of partitioning operations from a largest coding unit to a smallest coding unit.

When a resolution is high or a data amount is large (e.g., above a predetermined threshold resolution and/or data amount), it is preferable that a maximum size of a coding unit is large so as to not only increase encoding efficiency but also to accurately reflect the characteristics of an image. Accordingly, the maximum size of 64 may be selected for the coding unit of the video data 310 and 320, which have a higher resolution than the video data 330.

Since the maximum depth of the video data 310 is 2, coding units 315 of the video data 310 may include a largest coding unit having a long axis size of 64, and coding units having long axis sizes of 32 and 16 since depths are deepened to two layers by partitioning the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by partitioning the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by partitioning the largest coding unit three times. As a depth deepens, detailed information may be precisely expressed.

Figure 11:
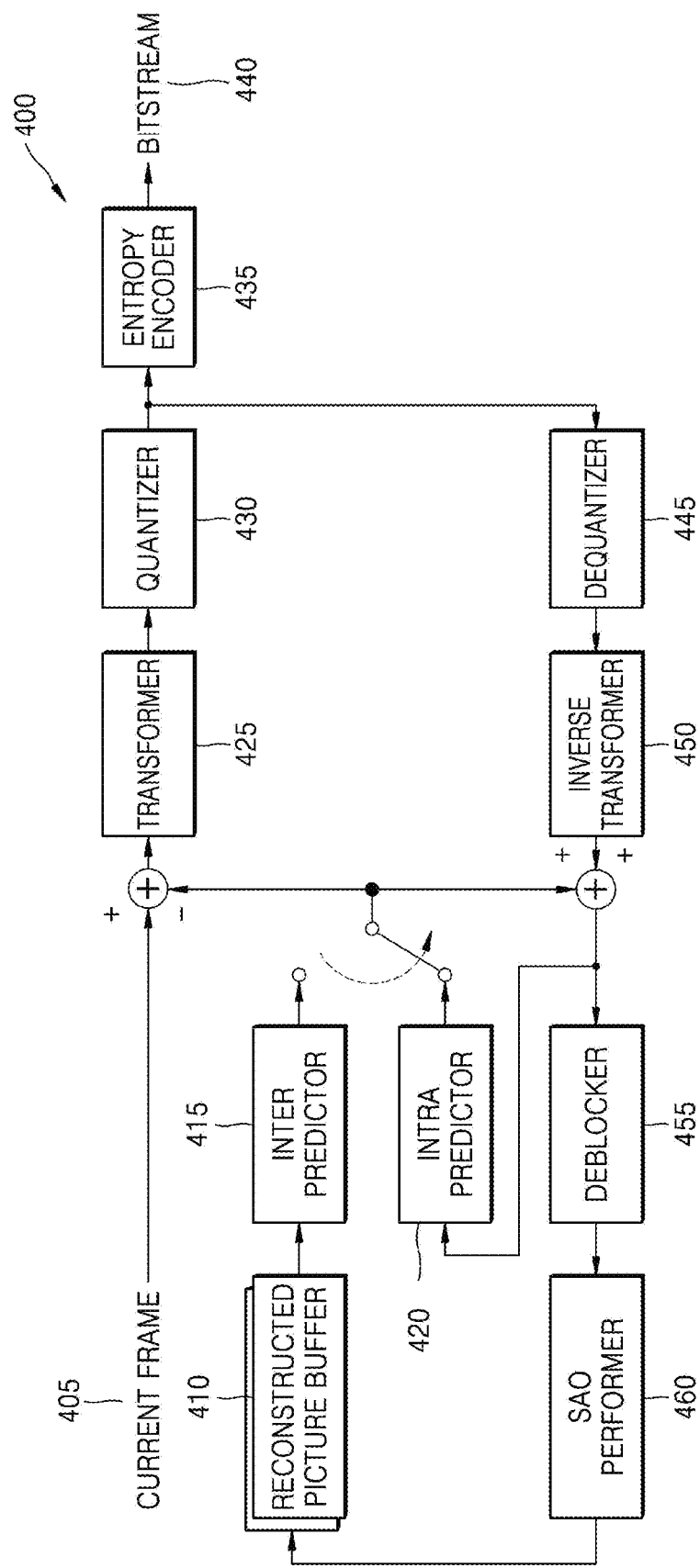
FIG. 11 is a block diagram of an image encoder based on coding units, according to various embodiments.

FIG. 11 is a block diagram of an image encoder 400 based on coding units, according to various embodiments.

The image encoder 400 according to various embodiments performs operations of the video encoding apparatus 100 so as to encode image data. That is, an intra predictor 420 performs intra prediction on coding units in an intra mode, from among a current image 405, per prediction unit, and an inter predictor 415 performs inter prediction on coding units in an inter mode by using the current image 405 and a reference image obtained from a reconstructed picture buffer 410 according to prediction units. The current image 405 may be partitioned into largest coding units, and then the largest coding units may be sequentially encoded. In this regard, the largest coding unit that is to be partitioned into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transform coefficient through a transformer 425 and a quantizer 430 per transform unit. The quantized transform coefficient is reconstructed as the residue data in a spatial domain through an inverse-quantizer 445 and an inverse-transformer 450. The reconstructed residue data in the spatial domain is added to the prediction data of the coding unit of each mode output from the intra predictor 420 or the inter predictor 415 to be reconstructed as data in a spatial domain of the coding unit of the current image 405.

The reconstructed data in the spatial domain is generated as a reconstructed image through a deblocking unit 455 and an SAO performer 460. The reconstructed image is stored in the reconstructed picture buffer 410. Reconstructed images stored in the reconstructed picture buffer 410 may be used as a reference image for inter prediction of another image. The transform coefficient quantized by the transformer 425 and the quantizer 430 may be output as a bitstream 440 through an entropy encoder 435.

In order for the image encoder 400 according to various embodiments to be applied in the video encoding apparatus 100, components of the image encoder 400, i.e., the inter predictor 415, the intra predictor 420, the transformer 425, the quantizer 430, the entropy encoder 435, the inverse-quantizer 445, the inverse-transformer 450, the deblocking unit 455, and the SAO performer 460, perform operations based on each coding unit among coding units having a tree structure per largest coding unit.

In particular, the intra predictor 420 and the inter predictor 415 may determine a partition mode and a prediction mode of each coding unit from among the coding units having a tree structure, based on the maximum size and the maximum depth of a current largest coding unit, and the transformer 425 may determine whether to partition a transform unit according to a quad tree in each coding unit from among the coding units having a tree structure.

Figure 12:
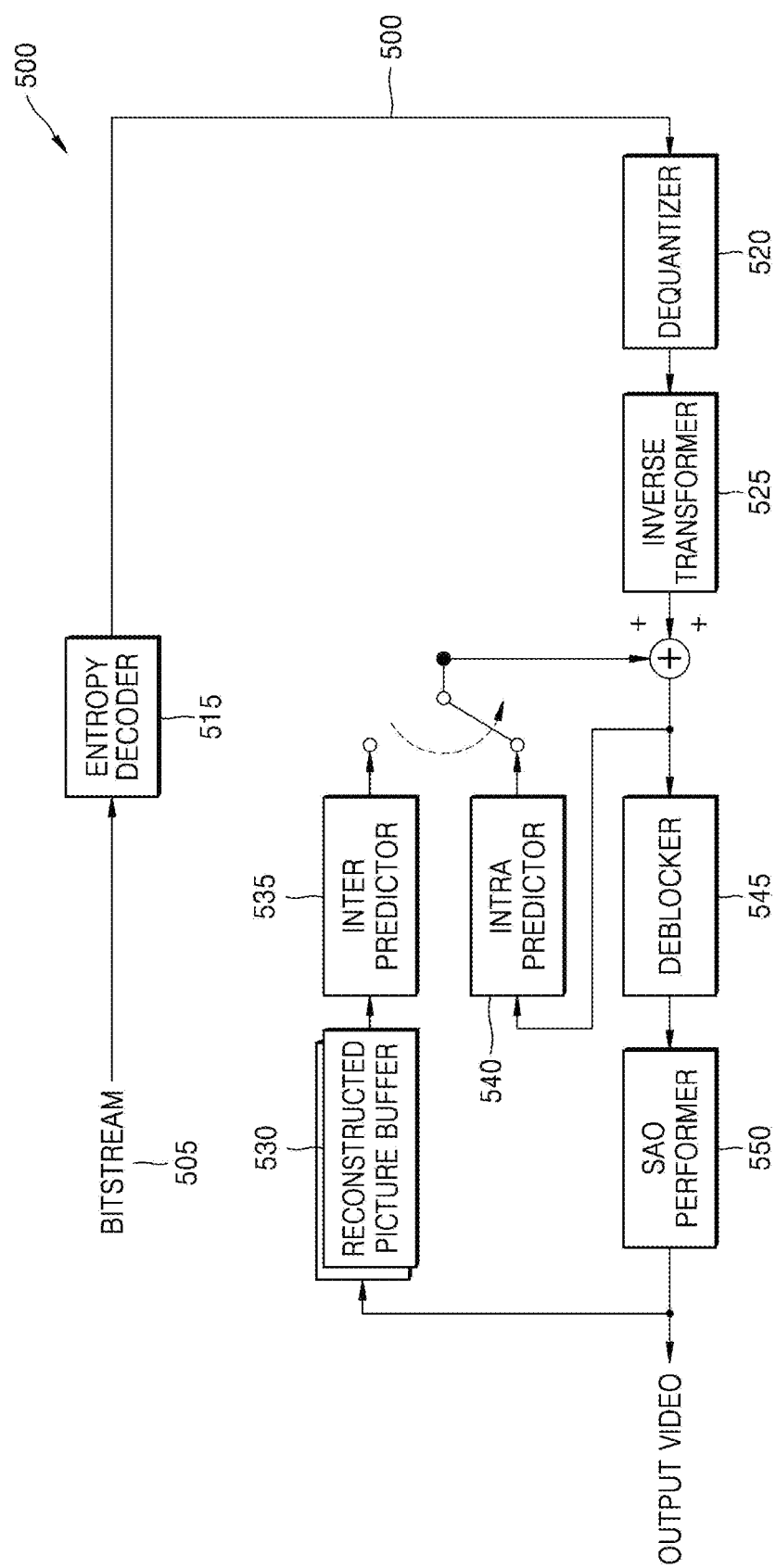
FIG. 12 is a block diagram of an image decoder based on coding units, according to various embodiments.

FIG. 12 is a block diagram of an image decoder 500 based on coding units, according to various embodiments.

An entropy decoder 515 parses, from a bitstream 505, encoded image data to be decoded and encoding information required for decoding. The encoded image data corresponds to a quantized transform coefficient, and an inverse-quantizer 520 and an inverse-transformer 525 reconstruct residue data from the quantized transform coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Also, reconstructed images that are stored in the reconstructed picture buffer 530 may be output as reference images.

In order for the image data decoder 230 of the video decoding apparatus 200 to decode the image data, operations after the entropy decoder 515 of the image decoder 500 according to various embodiments may be performed.

In order for the image decoder 500 to be applied in the video decoding apparatus 200 according to various embodiments, components of the image decoder 500, i.e., the entropy decoder 515, the inverse-quantizer 520, the inverse-transformer 525, the intra predictor 540, the inter predictor 535, the deblocking unit 545, and the SAO performer 550, may perform operations based on coding units having a tree structure for each largest coding unit.

In particular, the intra predictor 540 and the inter predictor 535 may determine a partition mode and a prediction mode of each coding unit from among the coding units according to a tree structure, and the inverse-transformer 525 may determine whether or not to partition a transform unit according to a quad-tree structure in each coding unit.

Figure 13:
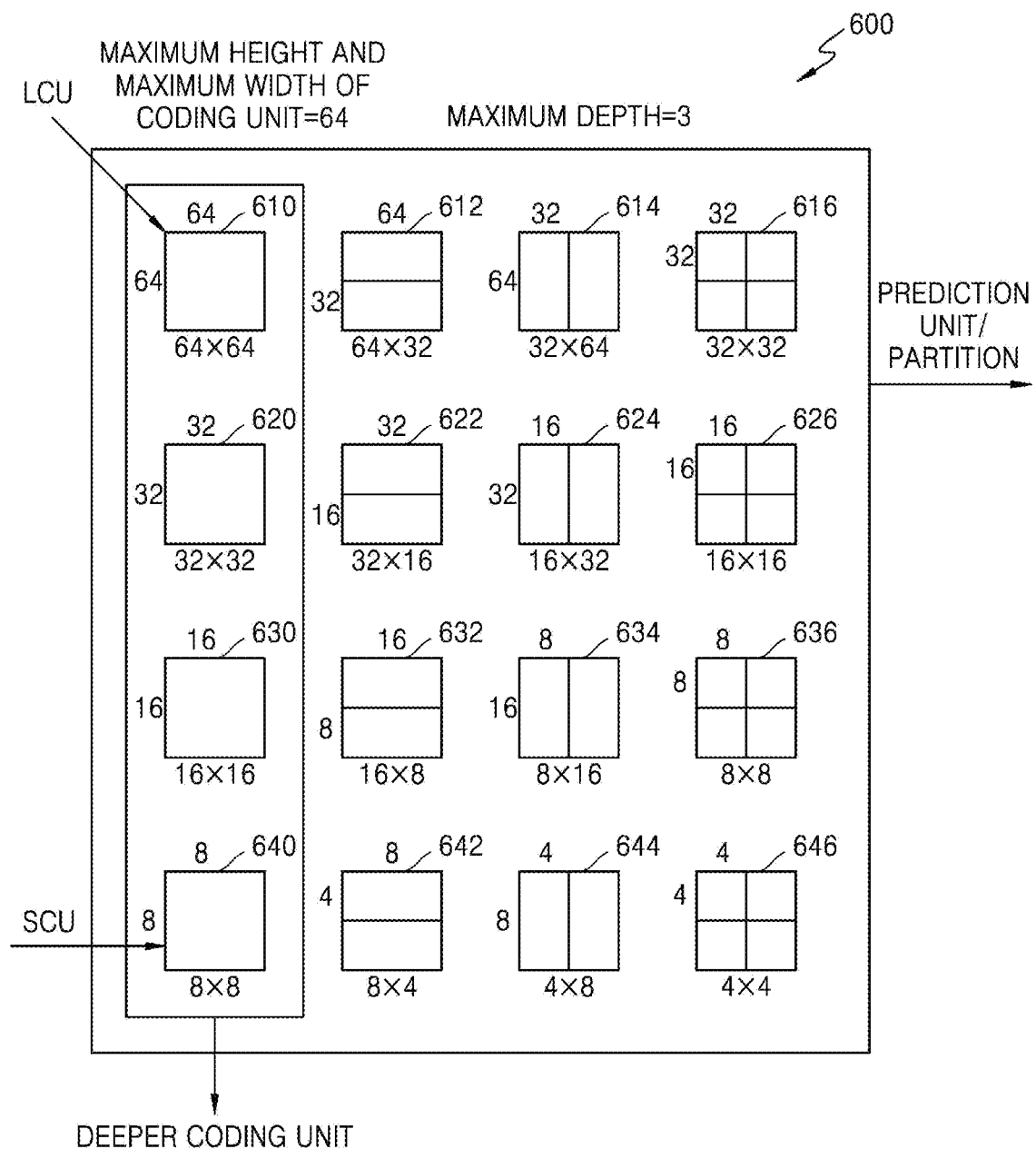
FIG. 13 is a diagram illustrating coding units and partitions, according to various embodiments.

FIG. 13 illustrates coding units according to depths and partitions, according to various embodiments.

The video encoding apparatus 100 according to various embodiments and the video decoding apparatus 200 according to various embodiments consider characteristics of an image by using hierarchical coding units. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to various embodiments, the maximum height and the maximum width of the coding units are each 64, and the maximum depth is 3. In this case, the maximum depth refers to a total number of times the coding unit is partitioned from the largest coding unit to the smallest coding unit. Since a depth deepens along a vertical axis of the hierarchical structure of coding units 600, a height and a width of the deeper coding unit are each partitioned. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 8×8 and a depth of 3 is a smallest coding unit.

The prediction unit and the partitions of a coding unit are arranged along the horizontal axis according to each depth. That is, when the coding unit 610 having a size of 64×64 and a depth of 0 is a prediction unit, the prediction unit may be partitioned into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be partitioned into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be partitioned into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be partitioned into partitions included in the coding unit 640, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

FIG. 14 illustrates a relationship between a coding unit and transform units, according to various embodiments.

The video encoding apparatus 100 according to various embodiments or the video decoding apparatus 200 according to various embodiments encodes or decodes an image according to coding units having sizes less than or equal to a largest coding unit for each largest coding unit. Sizes of transform units for transformation during an encoding process may be selected based on data units that are not larger than a corresponding coding unit.

For example, in the video encoding apparatus 100 according to various embodiments or the video decoding apparatus 200 according to various embodiments, when a size of a coding unit 710 is 64×64, transformation may be performed by using transform units 720 each having a size of 32×32.

Also, data of the coding unit 710 having the size of 64×64 may be encoded by performing the transformation on each of transform units having a size of 32×32, 16×16, 8×8, and 4×4, which are smaller than 64×64, and then a transform unit having the minimum coding error with respect to an original image may be selected.

FIG. 15 illustrates a plurality of pieces of encoding information according to various embodiments.

The output unit 130 of the video encoding apparatus 100 according to various embodiments may encode and transmit, as partition information, partition mode information 800, prediction mode information 810, and transform unit size information 820 for each coding unit corresponding to a depth.

The partition mode information 800 indicates information about a shape of a partition obtained by partitioning a prediction unit of a current coding unit, wherein the partition is a data unit for prediction encoding the current coding unit. For example, a current coding unit CU_0 having a size of 2N×2N may be partitioned into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transform unit size information 820 represents a transform unit to be based on when transformation is performed on a current coding unit. For example, the transform unit may be one of a first intra transform unit 822, a second intra transform unit 824, a first inter transform unit 826, and a second inter transform unit 828.

The image data and encoding information extractor 220 of the video decoding apparatus 200 may extract and use the partition mode information 800, the prediction mode information 810, and the transform unit size information 820 for each deeper coding unit.

Figure 16:
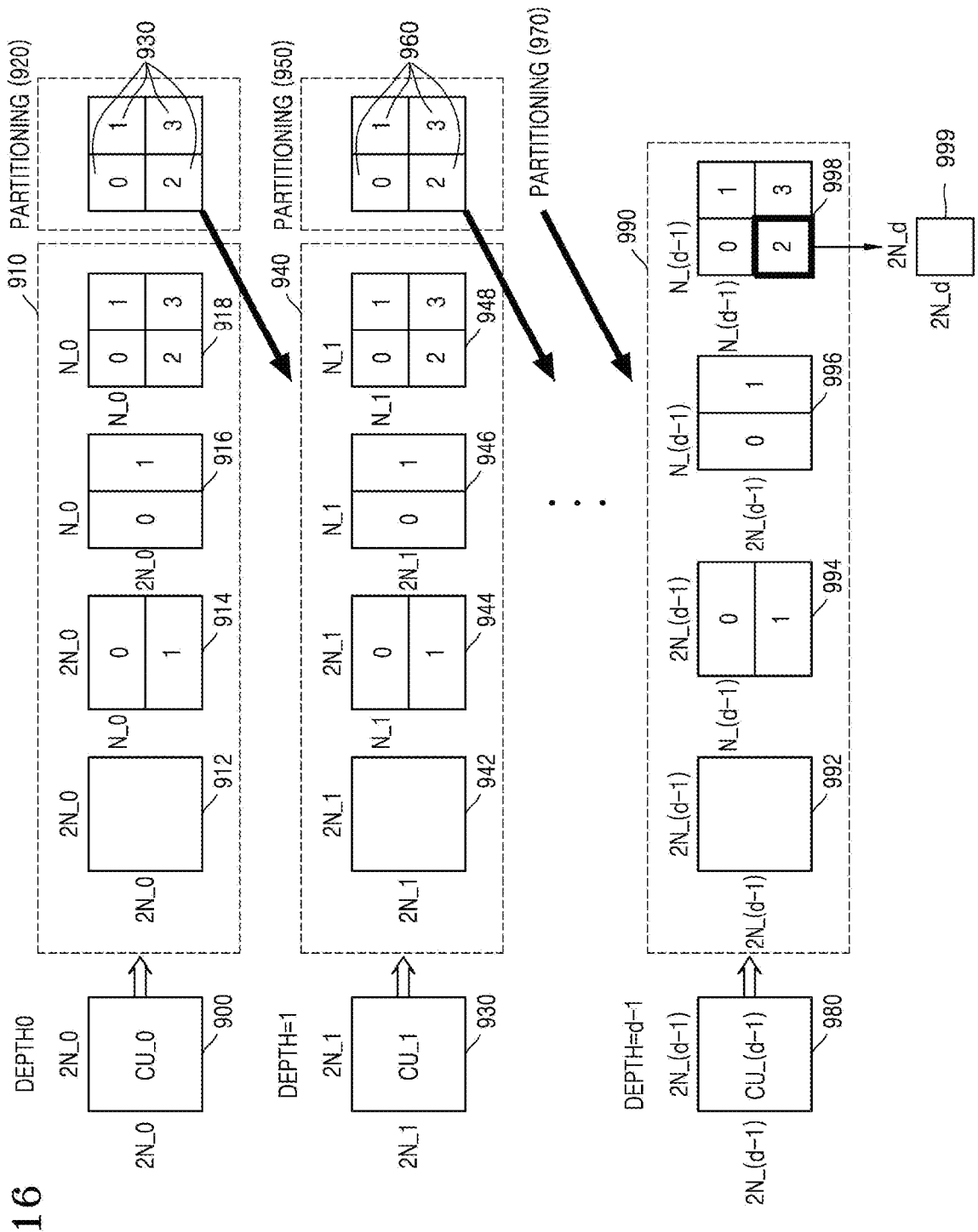
FIG. 16 is a diagram of coding units according to various embodiments.

FIG. 16 illustrates deeper coding units according to depths, according to various embodiments.

Partition information may be used to represent a change in a depth. The partition information indicates whether a coding unit of a current depth is partitioned into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically partitioning the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

When an encoding error is smallest in one of the partition modes 912, 914, and 916 having the sizes of 2N_0×2N_0, 2N_0×N_0 and N_0×2N_0, the prediction unit 910 may not be partitioned into a lower depth.

When the encoding error is the smallest in the partition mode 918 having the size of N_0×N_0, a depth is changed from 0 to 1 and partitioning is performed (operation 920), and encoding may be repeatedly performed on coding units 930 of a partition mode having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

When an encoding error is the smallest in the partition mode 948 having the size of N_1×N_1, a depth is changed from 1 to 2 and partitioning is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and partition information may be set until when a depth corresponds to d−2. That is, when encoding is performed up to when the depth is d−1 after a coding unit corresponding to a depth of d−2 is partitioned (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition mode 998 having the size of N_(d−1)×N_(d−1) has the minimum encoding error, since a maximum depth is d, a coding unit CU_(d−1) having a depth of d−1 is no longer partitioned into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, partition information for a coding unit 952 having a depth of d−1 is not set.

A data unit 999 may be a "minimum unit" for the current largest coding unit. A minimum unit according to various embodiments may be a square data unit obtained by partitioning a smallest coding unit having a lowermost depth by 4. By performing the encoding repeatedly, the video encoding apparatus 100 according to various embodiments may select a depth generating the minimum encoding error by comparing encoding errors according to depths of the coding unit 900 to determine a depth, and may set a corresponding partition mode and a prediction mode as an encoding mode of the depth.

As such, the minimum encoding errors according to depths are compared in all of the depths of 0, 1, . . . , d−1, d, and a depth having a minimum encoding error may be determined as a depth. The depth, the partition mode of the prediction unit, and the prediction mode may be encoded and transmitted as partition information. Also, since a coding unit has to be partitioned from a depth of 0 to a depth, only partition information of the depth is set to 0, and partition information of depths excluding the depth is set to 1.

The image data and encoding information extractor 220 of the video decoding apparatus 200 according to various embodiments may extract and use a depth and prediction unit information about the coding unit 900 so as to decode the coding unit 912. The video decoding apparatus 200 according to various embodiments may determine a depth, in which partition information is 0, as a depth by using partition information according to depths, and may use, for decoding, partition information about the corresponding depth.

Figure 17:
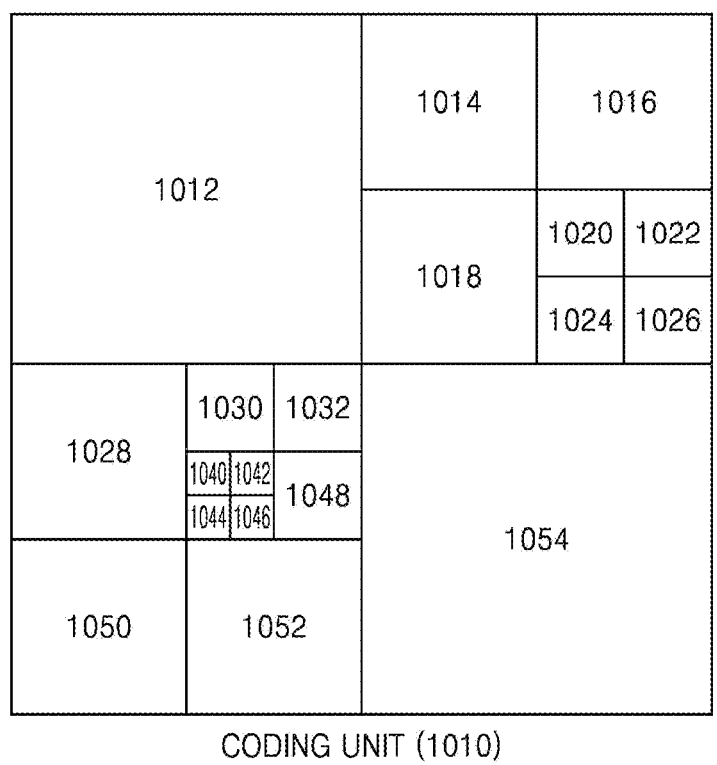
FIGS. 17, 18, and 19 are diagrams for describing a relationship between coding units, prediction units, and transform units, according to various embodiments.
Figure 18:
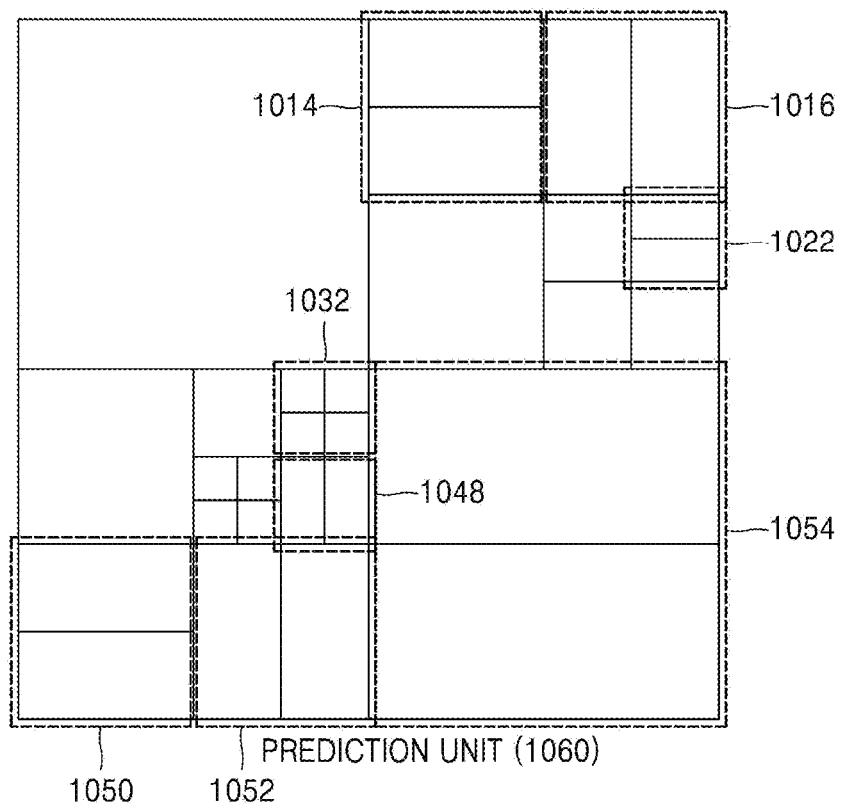
Figure 19:
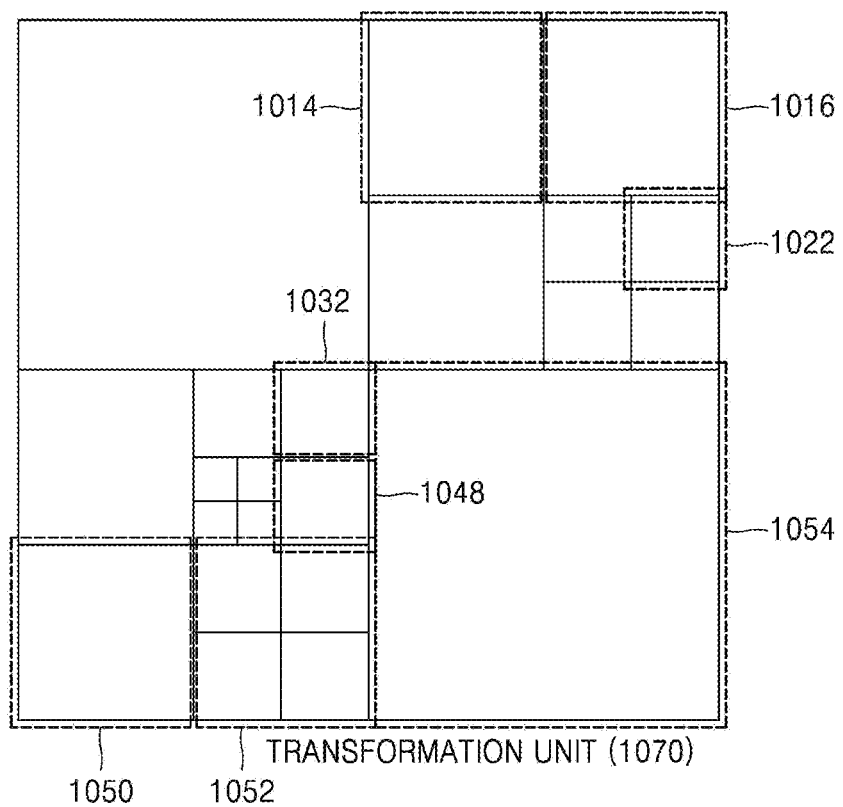

FIGS. 17, 18, and 19 illustrate a relationship between coding units, prediction units, and transform units, according to various embodiments.

Coding units 1010 are deeper coding units according to depths determined by the video encoding apparatus 100, in a largest coding unit. Prediction units 1060 are partitions of prediction units of each of the coding units 1010 according to depths, and transform units 1070 are transform units of each of the coding units according to depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by partitioning the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transform units 1070 in a data unit that is smaller than the coding unit 1052. Also, the coding units 1014, 1016, 1022, 1032, 1048, 1050, 1052, and 1054 in the transform units 1760 are data units different from those in the prediction units 1060 in terms of sizes and shapes. That is, the video encoding apparatus 100 and the video decoding apparatus 200 according to various embodiments may perform intra prediction, motion estimation, motion compensation, and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include partition information about a coding unit, partition mode information, prediction mode information, and transform unit size information. Table 1 below shows the encoding information that may be set by the video encoding apparatus 100 and the video decoding apparatus 200 according to various embodiments.

TABLE 1

| | | | Size of Transform unit | | |
|---|---|---|---|---|---|
| | Partition Mode | | Split | Split | |
| Prediction Mode | Symmetrical Partition Mode | Asymmetrical Partition Mode | Information 0 of Transform unit | Information 1 of Transform unit | Partition Information 1 |
| Intra Inter | 2N × 2N 2N × N | 2N × nU 2N × nD | 2N × 2N | N × N (Symmetrical | Repeatedly Encode |

TABLE 1-continued

Partition Information 0
(Encoding on Coding Unit having Size of 2N × 2N and Current Depth of d)

| Prediction Mode | Partition Mode | | Size of Transform unit | | Partition Information 1 |
| --- | --- | --- | --- | --- | --- |
| | Symmetrical Partition Mode | Asymmetrical Partition Mode | Split Information 0 of Transform unit | Split Information 1 of Transform unit | |
| Skip (Only 2N × 2N) | N × 2N<br>N × N | nL × 2N<br>nR × 2N | | Partition Mode)<br>N/2 × N/2<br>(Asymmetrical Partition Mode) | Coding Units having Lower Depth of d + 1 |

The output unit 130 of the video encoding apparatus 100 according to various embodiments may output the encoding information about the coding units having a tree structure, and the image data and encoding information extractor 220 of the video decoding apparatus 200 according to various embodiments may extract the encoding information about the coding units having a tree structure from a received bitstream.

Partition information indicates whether a current coding unit is partitioned into coding units of a lower depth. When partition information of a current depth d is 0, a depth, in which a current coding unit is no longer partitioned into a lower depth, is a depth, and thus partition mode information, a prediction mode, and transform unit size information may be defined for the depth. When the current coding unit has to be further partitioned according to the partition information, encoding has to be independently performed on each of four partitioned coding units of a lower depth.

The prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically partitioning a height or a width of a prediction unit, and asymmetrical partition modes having sizes of 2N×nU, 2N×nD, nL×2N, and nR×2N, which are obtained by asymmetrically partitioning the height or width of the prediction unit. The asymmetrical partition modes having the sizes of 2N×nU and 2N×nD may be respectively obtained by partitioning the height of the prediction unit in 1:3 and 3:1, and the asymmetrical partition modes having the sizes of nL×2N and nR×2N may be respectively obtained by partitioning the width of the prediction unit in 1:3 and 3:1.

The size of the transform unit may be set to be two types in the intra mode and two types in the inter mode. That is, when partition information of the transform unit is 0, the size of the transform unit may be 2N×2N, which is the size of the current coding unit. When partition information of the transform unit is 1, the transform units may be obtained by partitioning the current coding unit. Also, when a partition mode of the current coding unit having the size of 2N×2N is a symmetrical partition mode, a size of a transform unit may be N×N, and when the partition mode of the current coding unit is an asymmetrical partition mode, the size of the transform unit may be N/2×N/2.

The encoding information about coding units having a tree structure according to various embodiments may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, when a current coding unit is predicted based on adjacent data units, encoding information of data units in deeper coding units adjacent to the current coding unit may be directly referred to and used.

In another embodiment, when a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 20:
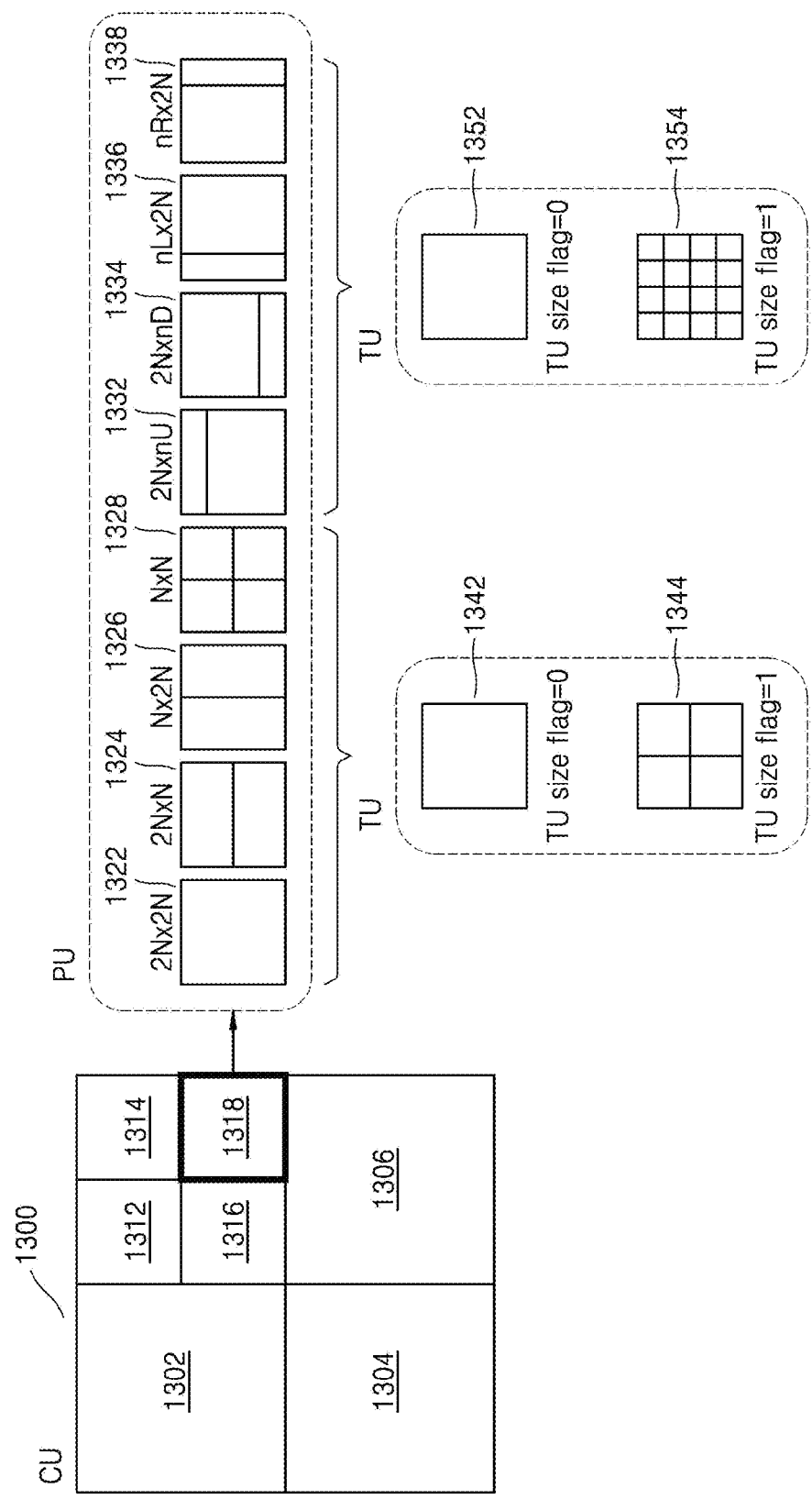
FIG. 20 illustrates a relationship between a coding unit, a prediction unit, and a transform unit, according to encoding mode information of Table 1.

FIG. 20 illustrates a relationship between a coding unit, a prediction unit, and a transform unit, according to encoding mode information of Table 1.

A largest coding unit 1300 includes coding units 1302, 1304, 1306, 1312, 1314, 1316, and 1318 of varying depths. Here, since the coding unit 1318 is a coding unit of a depth (e.g., a predefined depth), partition information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transform unit partition information (TU size flag) is a type of a transformation index, and a size of a transform unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, when the transform unit partition information is 0, a transform unit 1342 having a size of 2N×2N is set, and when the transform unit partition information is 1, a transform unit 1344 having a size of N×N may be set.

When the partition mode information is set to be one of asymmetrical partition modes 2N×nU 1332, 2N×nD 1334, nL×2N 1336, and nR×2N 1338, when the transform unit partition information (TU size flag) is 0, a transform unit 1352 having a size of 2N×2N may be set, and when the transform unit partition information is 1, a transform unit 1354 having a size of N/2×N/2 may be set.

The transform unit partition information (TU size flag) described above with reference to FIG. 20 is a flag having a value of 0 or 1, but the transform unit partition information according to an embodiment is not limited to a flag having 1 bit, and the transform unit may be hierarchically partitioned while the transform unit partition information increases in a manner of 0, 1, 2, 3 . . . etc., according to setting. The transform unit partition information may be an example of the transformation index.

In this case, the size of a transform unit that has been actually used may be expressed by using the transform unit partition information according to various embodiments, together with a maximum size of the transform unit and a minimum size of the transform unit. The video encoding apparatus 100 according to various embodiments may encode maximum transform unit size information, minimum transform unit size information, and maximum transform unit partition information. The result of encoding the maximum transform unit size information, the minimum transform unit size information, and the maximum transform unit partition information may be inserted into a sequence parameter set (SPS). The video decoding apparatus 200 according to various embodiments may decode video by using the maximum transform unit size information, the minimum transform unit size information, and the maximum TU size flag.

For example, (a) when the size of a current coding unit is 64×64 and a maximum transform unit size is 32×32, (a-1) then the size of a transform unit may be 32×32 when a TU size flag is 0, (a-2) may be 16×16 when the TU size flag is 1, and (a-3) may be 8×8 when the TU size flag is 2.

As another example, (b) when the size of the current coding unit is 32×32 and a minimum transform unit size is 32×32, (b-1) then the size of the transform unit may be 32×32 when the TU size flag is 0. Here, the TU size flag cannot be set to a value other than 0, since the size of the transform unit cannot be less than 32×32.

As another example, (c) when the size of the current coding unit is 64×64 and a maximum TU size flag is 1, then the TU size flag may be 0 or 1. Here, the TU size flag cannot be set to a value other than 0 or 1.

Thus, when it is defined that the maximum TU size flag is "MaxTransformSizeIndex," a minimum transform unit size is "MinTransformSize," and a transform unit size is "RootTuSize" when the TU size flag is 0, then a current minimum transform unit size "CurrMinTuSize" that can be determined in a current coding unit may be defined by Equation 17:

$$\text{CurrMinTuSize}=\max(\text{MinTransformSize},\text{RootTuSize}/(2^{\wedge}\text{MaxTransformSizeIndex})) \quad [\text{Equation 17}]$$

Compared to the current minimum transform unit size "CurrMinTuSize" that can be determined in the current coding unit, a transform unit size "RootTuSize" when the TU size flag is 0 may denote a maximum transform unit size that can be selected in the system. In Equation 17, "RootTuSize/(2^MaxTransformSizeIndex)" denotes a transform unit size when the transform unit size "RootTuSize," when the TU size flag is 0, is partitioned by the number of times corresponding to the maximum TU size flag, and "MinTransformSize" denotes a minimum transformation size. Thus, a smaller value from among "RootTuSize/(2^MaxTransformSizeIndex)" and "MinTransformSize" may be the current minimum transform unit size "CurrMinTuSize" that can be determined in the current coding unit.

According to various embodiments, the maximum transform unit size "RootTuSize" may vary according to the type of a prediction mode.

For example, when a current prediction mode is an inter mode, then "RootTuSize" may be determined by using Equation 18 below. In Equation 18, "MaxTransformSize" denotes a maximum transform unit size, and "PUSize" denotes a current prediction unit size.

$$\text{RootTuSize}=\min(\text{MaxTransformSize},\text{PUSize}) \quad [\text{Equation 18}]$$

That is, when the current prediction mode is the inter mode, the transform unit size "RootTuSize," when the TU size flag is 0, may be a smaller value from among the maximum transform unit size and the current prediction unit size.

When a prediction mode of a current partition unit is an intra mode, "RootTuSize" may be determined by using Equation 19 below. "PartitionSize" denotes the size of the current partition unit.

$$\text{RootTuSize}=\min(\text{MaxTransformSize},\text{PartitionSize}) \quad [\text{Equation 19}]$$

That is, when the current prediction mode is the intra mode, the transform unit size "RootTuSize" when the TU size flag is 0 may be a smaller value from among the maximum transform unit size and the size of the current partition unit.

However, the current maximum transform unit size "RootTuSize" that varies according to the type of a prediction mode in a partition unit is just an example and the present disclosure is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include magnetic storage media (e.g., hard disks, etc.), optical recording media (e.g., compact disc read-only memory (CD-ROM), digital versatile disk (DVD), Universal Serial Bus (USB), solid-state disk (SSD), etc.), or the like.

For convenience of description, the image encoding method and/or the video encoding method, which are described with reference to FIGS. 1 through 20, will be collectively referred to as 'the video encoding method'. In addition, the image decoding method and/or the video decoding method, which are described with reference to FIGS. 1 through 20, will be collectively referred to as "the video decoding method."

Also, a video encoding apparatus including the image encoding apparatus 10, the video encoding apparatus 100, or the image encoder 400 which are described with reference to FIGS. 1 through 20 will be collectively referred to as a "video encoding apparatus of the present disclosure." Also, a video decoding apparatus including the image decoding apparatus 40, the video decoding apparatus 200, or the image decoder 500 which are described with reference to FIGS. 1 through 20 will be collectively referred to as a "video decoding apparatus of the present disclosure."

A non-transitory computer-readable recording medium such as a disc 26000 that stores the programs according to various embodiments will now be described in detail.

Figure 21:
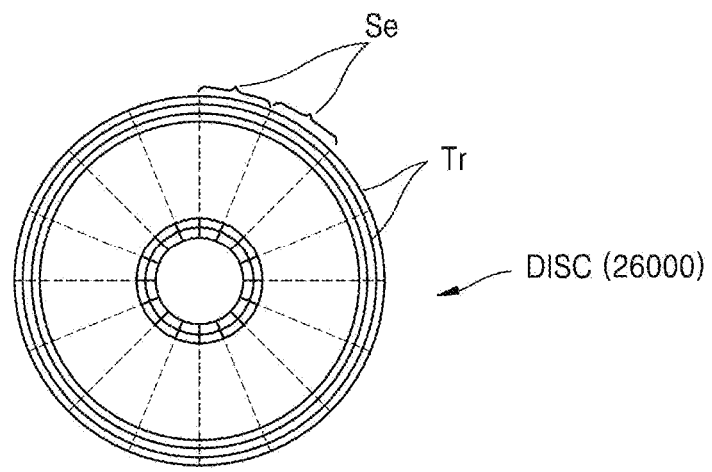
FIG. 21 illustrates a physical structure of a disc in which a program is stored, according to various embodiments.

FIG. 21 illustrates a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
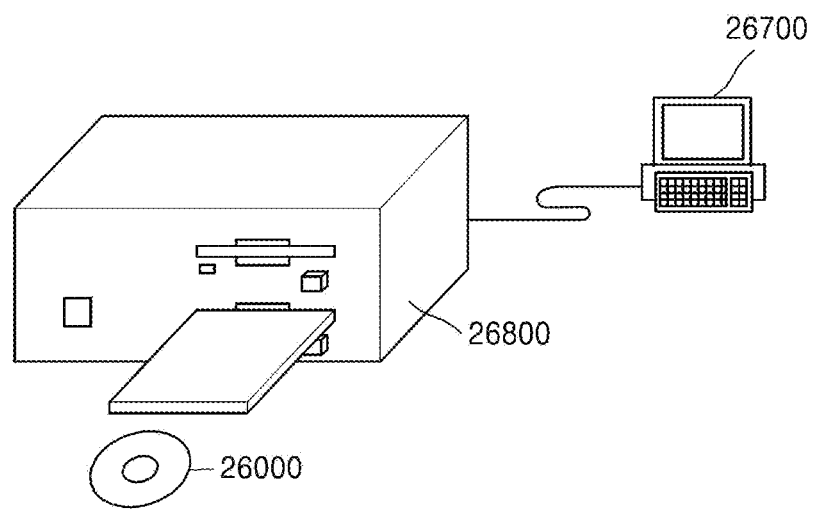
FIG. 22 illustrates a disc drive for recording and reading a program to and from a disc.

FIG. 22 illustrates a disc drive 26800 for recording and reading a program to and from the disc 26000. A computer system 27000 may store a program that executes at least one of the video encoding method and the video decoding method of the present disclosure, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method of the present disclosure may be stored not only in the disc 26000 illustrated in FIGS. 21 and 22 but may also be stored in a memory card, a ROM cassette, or a solid-state drive (SSD).

A system to which the video encoding method and the video decoding method according to the embodiments described above are applied will be described below.

Figure 23:
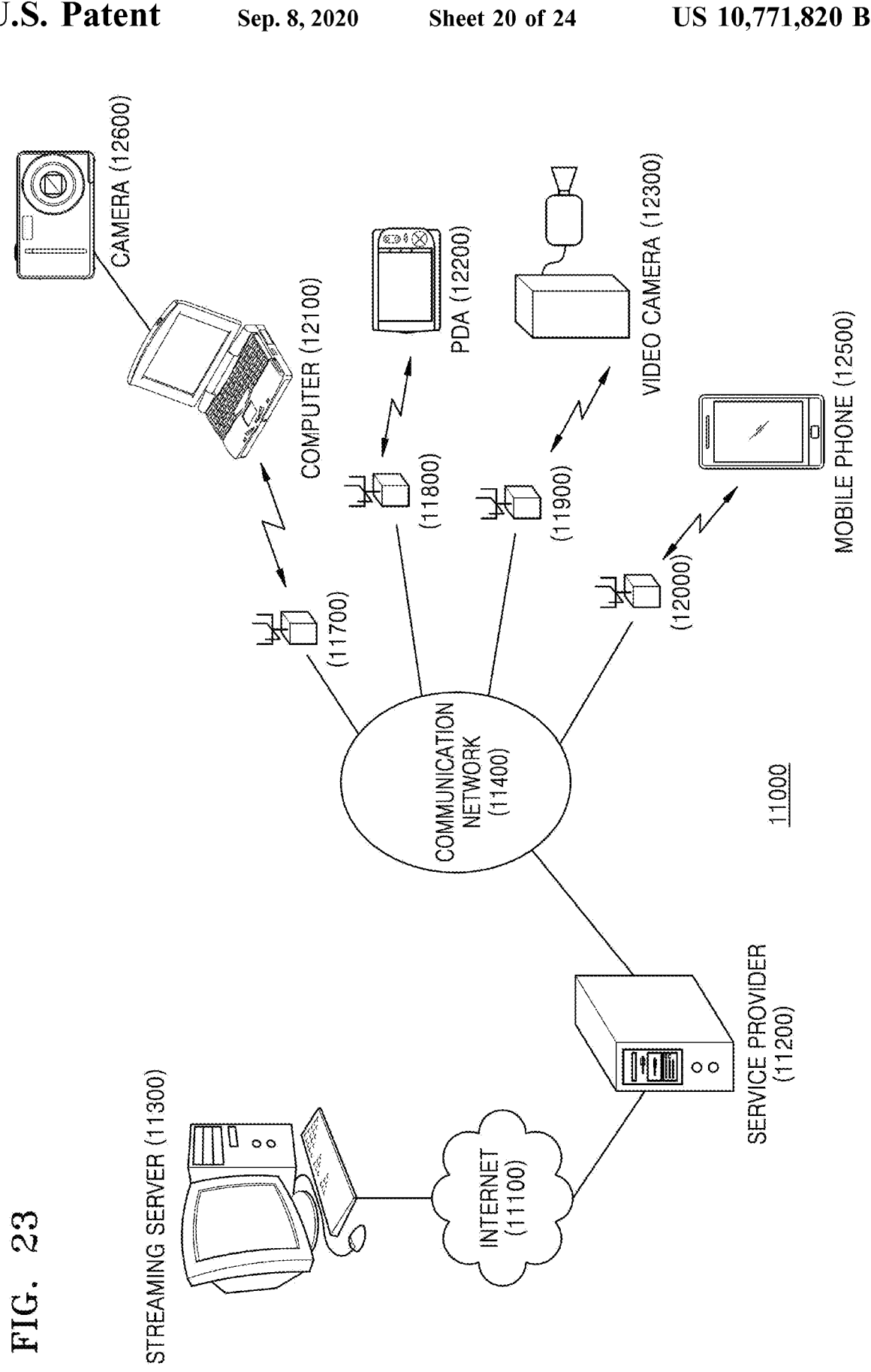
FIG. 23 illustrates an overall structure of a content supply system for providing a content distribution service.

FIG. 23 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to the structure as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handy-phone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 such as a digital camera is an imaging device capable of capturing both still images and video images. The video data captured by the camera 12600 may be encoded by using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

When video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to various embodiments, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and to decode and reproduce the encoded content data in real-time, thereby enabling personal broadcasting.

The video encoding apparatus and the video decoding apparatus of the present disclosure may be applied to encoding and decoding operations of the plurality of independent devices included in the content supply system 11000.

Figure 24:
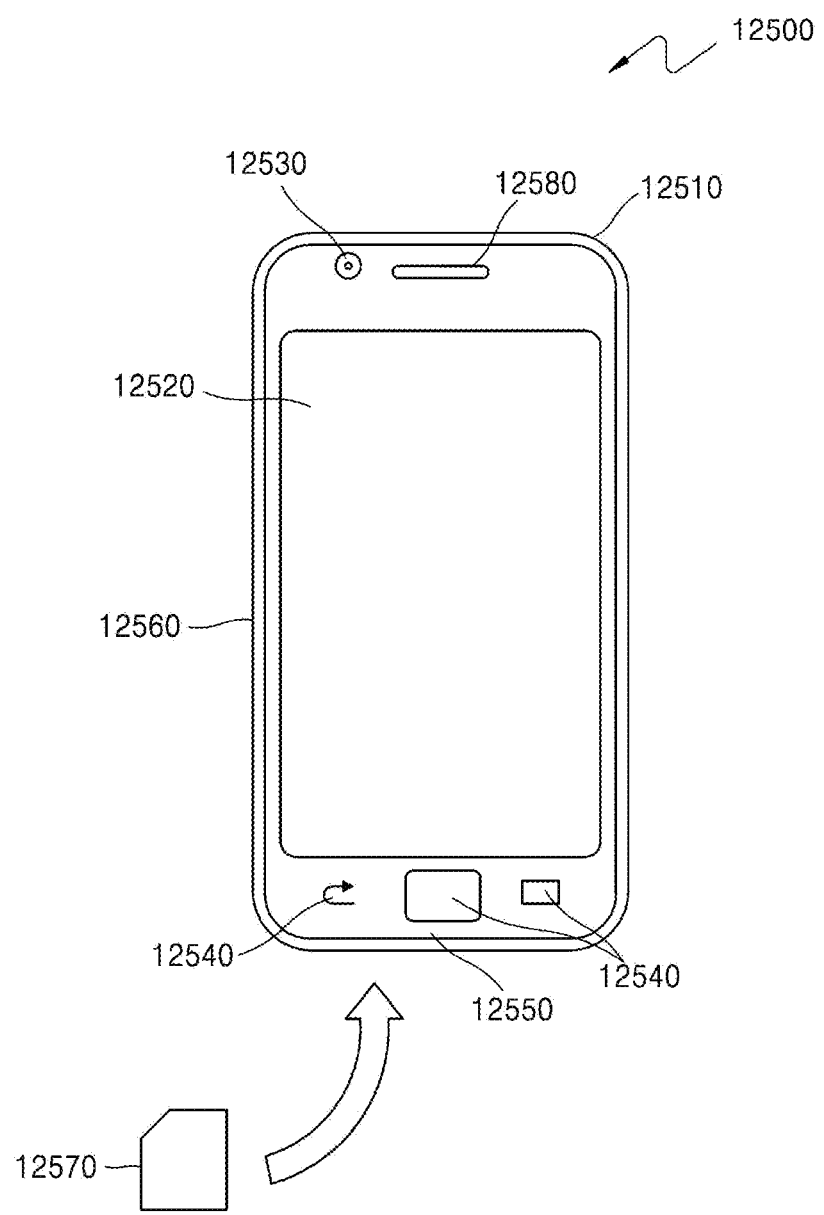
FIGS. 24 and 25 illustrate external and internal structures of a mobile phone to which a video encoding method and a video decoding method according to various embodiments are applied.
Figure 25:
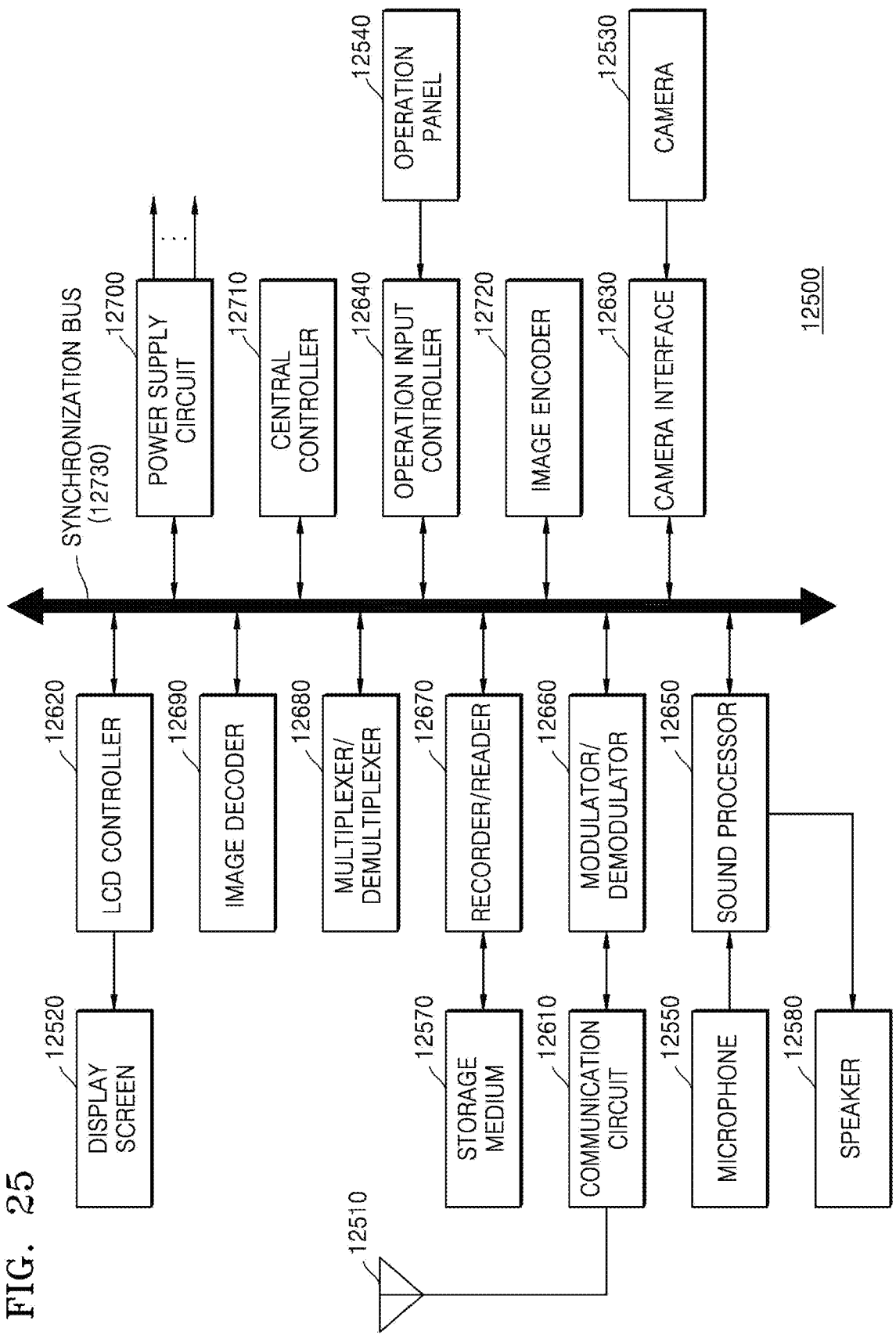

With reference to FIGS. 24 and 25, the mobile phone 12500 included in the content supply system 11000 according to an embodiment will now be described in detail.

FIG. 24 illustrates an external structure of the mobile phone 12500 to which the video encoding method and the video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. When the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read-only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

When a user operates a power button and sets from a "power off" state to a "power on" state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal through the modulation/demodulation unit 12660 and the communication circuit 12610, and may be transmitted via the antenna 12510.

When a text message, e.g., email, short message service (SMS), etc., is transmitted in a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image encoder 12720 via the camera interface 12630. The image data captured by the camera 12530 may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 so as to convert the received signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is converted to an analog sound signal via the modulation/demodulation unit 12660 and the sound processor 12650, and the analog sound signal is output via the speaker 12580 by the control of the central controller 12710.

When, in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus 200 described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present disclosure, may be a transmitting terminal including only the video encoding apparatus, or may be a receiving terminal including only the video decoding apparatus.

Figure 26:
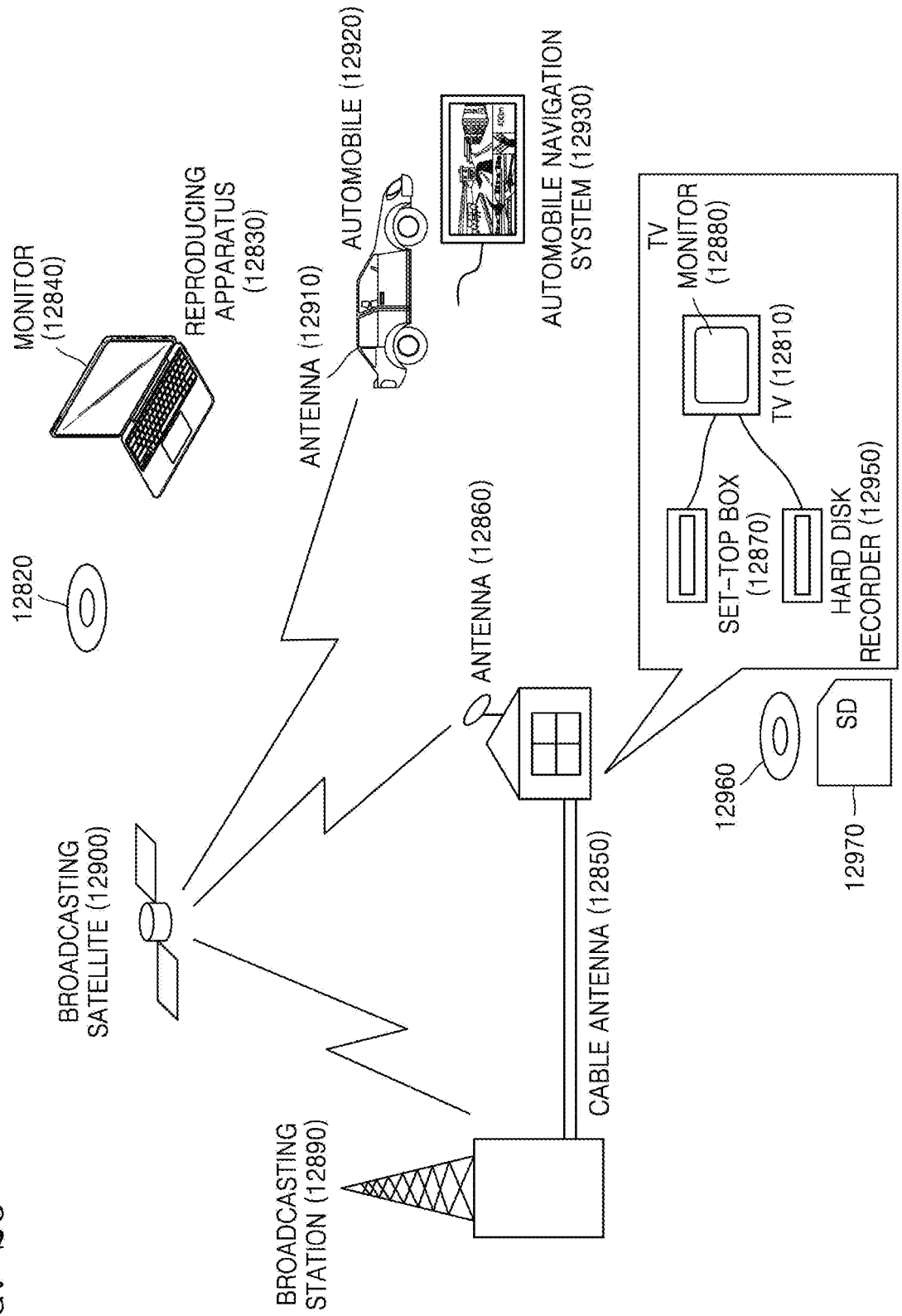
FIG. 26 is a diagram of a digital broadcasting system to which a communication system according to the present disclosure is applied.

A communication system according to the present disclosure is not limited to the communication system described above with reference to FIG. 23. For example, FIG. 26 illustrates a digital broadcasting system employing a communication system, according to various embodiments. The digital broadcasting system of FIG. 26 according to various embodiments may receive a digital broadcast transmitted via a satellite or a terrestrial network by using the video encoding apparatus and the video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. When the hard disk recorder 12950 (e.g., digital video recorder (DVR)) includes the video decoding apparatus of the present disclosure according to various embodiments, a video signal recorded on the DVD disc 12960, the SD card 12970, or another storage medium may be reproduced on the monitor 12880.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 26.

Figure 27:
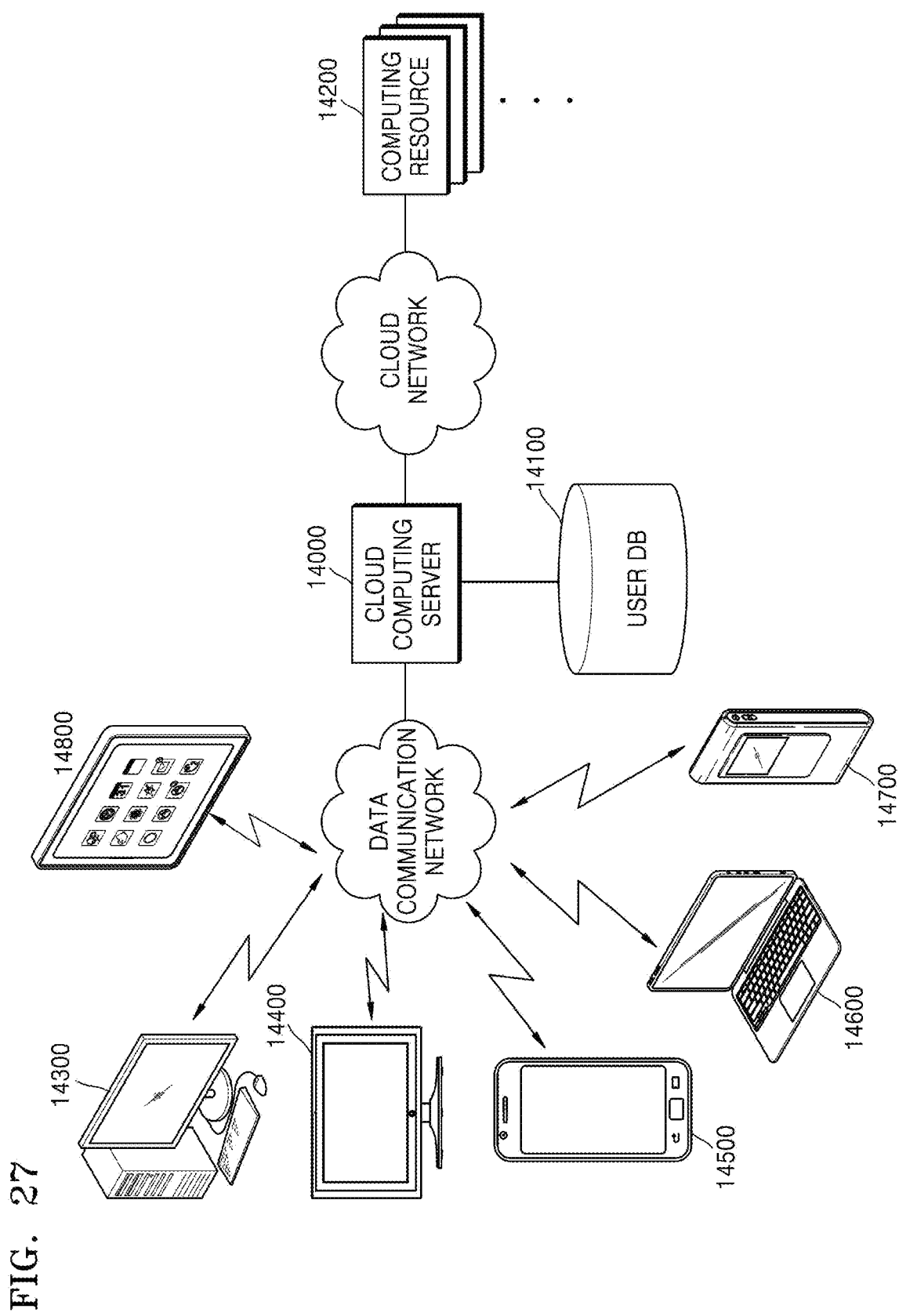
FIG. 27 illustrates a network structure of a cloud computing system using the video encoding apparatus and the video decoding apparatus, according to various embodiments.

FIG. 27 illustrates a network structure of a cloud computing system using the video encoding apparatus and the video decoding apparatus, according to various embodiments.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14100, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. When this video was being reproduced, then a method of streaming this video, performed by the cloud computing server 14000, may vary according to the request from the user terminal, i.e., according to whether the video will be reproduced, starting from a start thereof or a pausing point thereof. For example, when the user terminal requests to reproduce the video, starting from the start thereof, the cloud computing server 14000 transmits streaming data of the video starting from a first frame thereof to the user terminal. When the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present disclosure as described above with reference to FIGS. 1 through 20. As another example, the user terminal may include the video encoding apparatus of the present disclosure as described above with reference to FIGS. 1 through 20. Alternatively, the user terminal may include both the video decoding apparatus and the video encoding apparatus as described above with reference to FIGS. 1 through 20.

Various applications of the video encoding method, the video decoding method, the video encoding apparatus, and the video decoding apparatus described above with reference to FIGS. 1 through 20 have been described with reference to FIGS. 21 through 27. However, various embodiments of methods of storing the video encoding method and the video decoding method in a storage medium or various embodiments of methods of implementing the video encoding apparatus and the video decoding apparatus in a device described above with reference to FIGS. 1 through 20 are not limited to the embodiments of FIGS. 21 through 27.

The present disclosure may be embodied in many different forms without changing the technical concept or essential features of the disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

While one or more embodiments have been described with reference to the figures, it will be understood by those of ordinary skill in the art that various changes in form and details may be made therein without departing from the spirit and scope as defined by the following claims.

What is claimed is:

1. An image encoding method comprising:
generating a first picture reconstructed by using a residual picture and a predicted picture;
generating a second picture by applying a first artifact reduction filter to the first picture;
determining a picture having a smaller bit-rate distortion cost from among the first and second pictures by comparing a first bit-rate distortion cost of the first picture with a second bit-rate distortion cost of the second picture;
generating a third picture by applying an in-loop filter to the determined picture;
generating a fourth picture by applying a second artifact reduction filter to the third picture;
evaluating subjective quality and objective quality of each of the third and fourth pictures so as to determine a first distortion of the third picture and a second distortion of the fourth picture;
determining a picture having smaller distortion from among the third and fourth pictures by comparing the first distortion with the second distortion; and
generating, via a processor, a bitstream comprising information about whether the second artifact reduction filter is applied,
wherein the evaluating the subjective quality comprises evaluating the subjective quality of each of the third and fourth pictures based on a size of a display and a distance between the display and a viewer, and
wherein the evaluating the subjective quality comprises determining sharpness of each of the third and fourth pictures, based on sharpness of each of blocks in the third and fourth pictures.

2. The image encoding method of claim 1, wherein the sharpness of each of the blocks is determined according to respective modes of the blocks, and
wherein the modes are determined according to whether each of the blocks is a motion region and whether each of the blocks is a texture region or an edge region.

3. The image encoding method of claim 2, wherein the sharpness of each of the third and fourth pictures is determined by applying a weight to the sharpness of each of the blocks, the weight varying according to the size of the display and the distance between the display and the viewer.

4. The image encoding method of claim 1, wherein the evaluating the subjective quality and the objective quality comprises:
extracting a first colorfulness feature point, a first contrast feature point, and a first sharpness feature point from the third picture;
extracting a second colorfulness feature point, a second contrast feature point, and a second sharpness feature point from the fourth picture;
extracting a third colorfulness feature point, a third contrast feature point, and a third sharpness feature point from a high dynamic range (HDR) picture;
evaluating the objective quality of the third picture, based on a first difference between the first colorfulness feature point of the third picture and the third colorfulness feature point of the HDR picture, a second difference between the first contrast feature point of the third picture and the third contrast feature point of the HDR picture, and a third difference between the first sharpness feature point of the third picture and the third sharpness feature point of the HDR picture; and
evaluating the objective quality of the fourth picture, based on a fourth difference between the second colorfulness feature point of the fourth picture and the third colorfulness feature point of the HDR picture, a fifth difference between the second contrast feature point of the fourth picture and the third contrast feature point of the HDR picture, and a sixth difference between the second sharpness feature point of the fourth picture and the third sharpness feature point of the HDR picture.

5. The image encoding method of claim 1, further comprising updating the second artifact reduction filter so as to reduce the first distortion of the third picture and the second distortion of the fourth picture, based on the evaluated subjective quality and the evaluated objective quality.

6. The image encoding method of claim 1, wherein the first artifact reduction filter is applied to a coding unit, and the second artifact reduction filter is applied to a slice unit.

7. The image encoding method of claim 1, wherein the first artifact reduction filter and the second artifact reduction filter are identical.

8. A non-transitory computer-readable recording medium having recorded thereon a program for executing the image encoding method of claim 1.

9. An image decoding method comprising:
receiving a bitstream comprising information about whether to apply an artifact reduction filter after an in-loop filter is applied;
reconstructing a picture by performing decoding on the bitstream;
when the information indicates that the artifact reduction filter is to be applied after the in-loop filter is applied, applying the second artifact reduction filter to the reconstructed picture to which the in-loop filter has been applied; and
when the information indicates that the artifact reduction filter is not to be applied after the in-loop filter is applied, outputting the reconstructed picture to which the in-loop filter has been applied.

10. An image encoding apparatus comprising:
a first artifact reduction filter applier configured to generate a first picture reconstructed by using a residual picture and a predicted picture, and generate a second picture by applying a first artifact reduction filter to the first picture;
a bit-rate distortion cost comparator configured to determine a picture having a smaller bit-rate distortion cost from among the first and second pictures by comparing a first bit-rate distortion cost of the first picture with a second bit-rate distortion cost of the second picture;
a second artifact reduction filter applier configured to generate a third picture by applying an in-loop filter to the determined picture, and generate a fourth picture by applying a second artifact reduction filter to the third picture;
a distortion comparator configured to evaluate subjective quality and objective quality of each of the third and fourth pictures so as to determine a first distortion of the third picture and a second distortion of the fourth picture and determine a picture having smaller distortion from among the third and fourth pictures by comparing the first distortion with the second distortion; and
a bitstream generator configured to generate a bitstream comprising information about whether the second artifact reduction filter is applied,
wherein the distortion comparator is further configured to evaluate the subjective quality of each of the third and fourth pictures based on a size of a display and a distance between the display and a viewer, and determine sharpness of each of the third and fourth pictures, based on sharpness of each of blocks in the third and fourth pictures.

11. The image encoding apparatus of claim 10, wherein the sharpness of each of the blocks is determined according to respective modes of the blocks, and
wherein the modes are determined according to whether each of the blocks is a motion region and whether each of the blocks is a texture region or an edge region.

12. The image encoding apparatus of claim 11, wherein the sharpness of each of the third and fourth pictures is determined by applying a weight to the sharpness of each of the blocks, the weight varying according to the size of the display and the distance between the display and the viewer.

13. The image encoding apparatus of claim 10, wherein the distortion comparator is further configured to:
extract a first colorfulness feature point, a first contrast feature point, and a first sharpness feature point from the third picture,
extract a second colorfulness feature point, a second contrast feature point, and a second sharpness feature point from the fourth picture,
extract a third colorfulness feature point, a third contrast feature point, and a third sharpness feature point from a high dynamic range (HDR) picture,
evaluate the objective quality of the third picture, based on a first difference between the first colorfulness feature point of the third picture and the third colorfulness feature point of the HDR picture, a second difference between the first contrast feature point of the third picture and the third contrast feature point of the HDR picture, and a third difference between the first sharpness feature point of the third picture and the third sharpness feature point of the HDR picture, and
evaluate the objective quality of the fourth picture, based on a fourth difference between the second colorfulness feature point of the fourth picture and the third colorfulness feature point of the HDR picture, a fifth difference between the second contrast feature point of the fourth picture and the third contrast feature point of the HDR picture, and a sixth difference between the second sharpness feature point of the fourth picture and the third sharpness feature point of the HDR picture.

14. The image encoding apparatus of claim 10, further comprising a second artifact reduction filter updater configured to update the second artifact reduction filter so as to reduce the first distortion of the third and the second distortion of the fourth picture, based on the evaluated subjective quality and the evaluated objective quality.

15. The image encoding apparatus of claim 10, wherein the first artifact reduction filter is applied to a coding unit, and the second artifact reduction filter is applied to a slice unit.

* * * * *